United States Patent
Han

(10) Patent No.: US 10,028,293 B2
(45) Date of Patent: Jul. 17, 2018

(54) METHOD AND APPARATUS FOR CONTROLLING DATA TRANSMISSION ON RADIO COMMUNICATION NETWORK

(71) Applicant: Huawei Technologies Co., Ltd., Shenzhen, Guangdong (CN)

(72) Inventor: Guanglin Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 15/054,624

(22) Filed: Feb. 26, 2016

(65) Prior Publication Data

US 2016/0227556 A1    Aug. 4, 2016

Related U.S. Application Data

(63) Continuation of application No. PCT/CN2013/082641, filed on Aug. 30, 2013.

(51) Int. Cl.
*H04W 72/12* (2009.01)

(52) U.S. Cl.
CPC .................... *H04W 72/12* (2013.01)

(58) Field of Classification Search
CPC . H04W 72/12; H04W 48/12; H04W 74/0866; H04W 4/02
See application file for complete search history.

(56) References Cited

U.S. PATENT DOCUMENTS

2012/0314665 A1* 12/2012 Ishida ................ H01Q 1/246
370/329
2013/0336301 A1    12/2013 Deng et al.

FOREIGN PATENT DOCUMENTS

| CN | 101998265 A | 3/2011 |
|---|---|---|
| CN | 102056242 A | 5/2011 |
| CN | 102340880 A | 2/2012 |
| CN | 102655666 A | 9/2012 |
| EP | 2 672 757 A1 | 12/2013 |
| WO | WO 2005/078962 A1 | 8/2005 |
| WO | WO 2011/118997 A2 | 9/2011 |
| WO | WO 2012/116605 A1 | 9/2012 |

* cited by examiner

*Primary Examiner* — Anez Ebrahim

(57) ABSTRACT

Embodiments of the present invention provide a method and an apparatus for controlling data transmission on a radio communication network. The method includes: acquiring, by a base station, transmission attribute information, where the transmission attribute information includes attribute information of to-be-transmitted data and scheduling attribute information of the base station; and judging whether the acquired scheduling attribute information of the base station meets a preset scheduling condition; and if yes, the base station sends a scheduling suspension message and/or a scheduling start message to a terminal according to the transmission attribute information.

18 Claims, 12 Drawing Sheets

METHOD AND APPARATUS FOR CONTROLLING DATA TRANSMISSION ON RADIO COMMUNICATION NETWORK

CROSS-REFERENCE TO RELATED APPLICATIONS

This application is a continuation of International Application No. PCT/CN2013/082641, filed on Aug. 30, 2013, which is hereby incorporated by reference in its entirety.

TECHNICAL FIELD

The present invention relates to the field of radio communications, and in particular, to a method and an apparatus for controlling data transmission on a radio communication network.

BACKGROUND

The long term evolution (LTE) is a long-term evolution of the universal mobile telecommunication system (UMTS) technology stipulated by the $3^{rd}$ generation partnership project (3GPP) organization. In an LTE system, a radio channel resource between a terminal (user equipment, UE) and a base station (eNode B, Evolved NodeB, evolved NodeB) can be allocated and controlled by using the radio resource control (RRC) protocol.

After establishing a radio bearer with the eNode B, the UE sends a scheduling request (SR) to the eNode B to request radio resource scheduling. If the eNode B simultaneously serves a plurality of UEs, the eNode B allocates a small number of radio resource for the UE, because radio resource are limited. The small number of radio resource allocated by the eNode B and received by the UE cannot meet a requirement for radio resource transmission of the UE, the UE sends the scheduling request to the eNode B again to request radio resource scheduling; the eNode B allocates a small number of radio resource for the UE again, which repeats continuously until data transmission is complete. When a plurality of UEs requests radio resource scheduling and the amount of data transmitted by the UE is large, the base station gets congested easily; in addition, total time for the data transmission is relatively long, power consumption of the UE is high, and the data transmission efficiency is decreased.

SUMMARY

Embodiments of the present invention provide a method and an apparatus for controlling data transmission on a radio communication network. A scheduling suspension message/a scheduling start message is sent to a terminal according to transmission attribute information, thereby avoiding a situation in which the base station is congested, reducing scheduling time, and improving the data transmission efficiency of the radio communication network.

A first aspect of the embodiments of the present invention provides a method for controlling data transmission on a radio communication network, including:

acquiring, by a base station, transmission attribute information, where the transmission attribute information includes attribute information of to-be-transmitted data and scheduling attribute information of the base station; and judging whether the acquired scheduling attribute information of the base station meets a preset scheduling condition; and if yes, sending, by the base station, a scheduling suspension message and/or a scheduling start message to a terminal according to the transmission attribute information.

A second aspect of the embodiments of the present invention provides a method for controlling data transmission on a radio communication network, including:

receiving, by a terminal, a scheduling suspension message and/or a scheduling start message sent by a base station;

if the terminal receives the scheduling suspension message, suspending sending of a resource request to the base station according to the scheduling suspension message, where the scheduling suspension message includes attribute information of a scheduling suspension object; and if the terminal receives the scheduling start message, starting sending to-be-transmitted data to the base station according to the scheduling start message, where the scheduling start message includes attribute information of a scheduling start object.

A third aspect of the embodiments of the present invention provides a method for controlling data transmission on a radio communication network, including:

acquiring, by a multi-level scheduler, transmission attribute information, where the transmission attribute information includes attribute information of to-be-transmitted data and scheduling attribute information of a base station; and sending, by the multi-level scheduler, a control message including the transmission attribute information to the base station, so that the base station sends a scheduling suspension message and/or a scheduling start message to a terminal according to the control message.

A fourth aspect of the embodiments of the present invention provides an apparatus for controlling data transmission on a radio communication network, including:

a first acquiring module, configured to acquire transmission attribute information, where the transmission attribute information includes attribute information of to-be-transmitted data and scheduling attribute information of a base station;

a judging module, configured to judge whether the scheduling attribute information of the base station acquired by the first acquiring module meets a preset scheduling condition; and a first processing module, configured to: when a judging result of the judging module is yes, send a scheduling suspension message and/or a scheduling start message to a terminal according to the transmission attribute information.

A fifth aspect of the embodiments of the present invention provides a base station, including an input apparatus, an output apparatus, a memory, and a processor, where the memory stores a group of program code, and the processor is configured to call the program code stored in the memory, so as to perform the following operations:

acquire transmission attribute information, where the transmission attribute information includes attribute information of to-be-transmitted data and scheduling attribute information of the base station; and judge whether the acquired scheduling attribute information of the base station meets a preset scheduling condition; and if yes, the base station sends a scheduling suspension message and/or a scheduling start message to a terminal according to the transmission attribute information.

A sixth aspect of the embodiments of the present invention provides an apparatus for controlling data transmission on a radio communication network, including:

a receiving module, configured to receive a scheduling suspension message and/or a scheduling start message sent by a base station;

a scheduling suspension processing module, configured to: when the receiving module receives the scheduling suspension message, suspend sending of a resource request to the base station according to the scheduling suspension message, where the scheduling suspension message includes attribute information of a scheduling suspension object; and a scheduling start processing module, configured to: when the receiving module receives the scheduling start message, start sending to-be-transmitted data to the base station according to the scheduling start message, where the scheduling start message includes attribute information of a scheduling start object.

A seventh aspect of the embodiments of the present invention provides a terminal, including an input apparatus, an output apparatus, a memory, and a processor, where the memory stores a group of program code, and the processor is configured to call the program code stored in the memory, so as to perform the following operations:

receive a scheduling suspension message and/or a scheduling start message sent by a base station;

when receiving the scheduling suspension message, suspend sending of a resource request to the base station according to the scheduling suspension message, where the scheduling suspension message includes attribute information of a scheduling suspension object; and when receiving the scheduling start message, start sending to-be-transmitted data to the base station according to the scheduling start message, where the scheduling start message includes attribute information of a scheduling start object.

An eighth aspect of the embodiments of the present invention provides an apparatus for controlling data transmission on a radio communication network, including:

a third acquiring module, configured to acquire transmission attribute information, where the transmission attribute information includes attribute information of to-be-transmitted data and scheduling attribute information of a base station; and a second processing module, configured to send a control message including the transmission attribute information acquired by the third acquiring module to the base station, so that the base station sends a scheduling suspension message and/or a scheduling start message to a terminal according to the control message.

A ninth aspect of the embodiments of the present invention provides a multi-level scheduler, including an input apparatus, an output apparatus, a memory, and a processor, where the memory stores a group of program code, and the processor is configured to call the program code stored in the memory, so as to perform the following operations:

acquire transmission attribute information, where the transmission attribute information includes attribute information of to-be-transmitted data and scheduling attribute information of a base station;

send a control message including the transmission attribute information to the base station, so that the base station sends a scheduling suspension message and/or a scheduling start message to a terminal according to the control message.

A tenth aspect of the embodiments of the present invention provides a system for controlling data transmission on a radio communication network, including a base station and a terminal.

In a first possible implementation manner of the tenth aspect, the system further includes a multi-level scheduler.

By implementing the embodiments of the present invention, a scheduling suspension message and/or a scheduling start message can be sent to a terminal according to transmission attribute information; if the scheduling suspension message is sent to the terminal, the terminal can suspend sending of a resource request to a base station according to the scheduling suspension message; if the scheduling start message is sent to the terminal, the transmission resource can start to be allocated for to-be-transmitted data. Scheduling the data resource of the radio communication network according to the transmission attribute information can be achieved, thereby avoiding a situation in which the base station is congested, reducing scheduling time, and improving the data transmission efficiency of the radio communication network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make technical problems to be resolved, technical solutions, and beneficial effects of the present invention more comprehensible, the following further describes the present invention in detail with reference to the accompanying drawings and embodiments.

Figure 1:
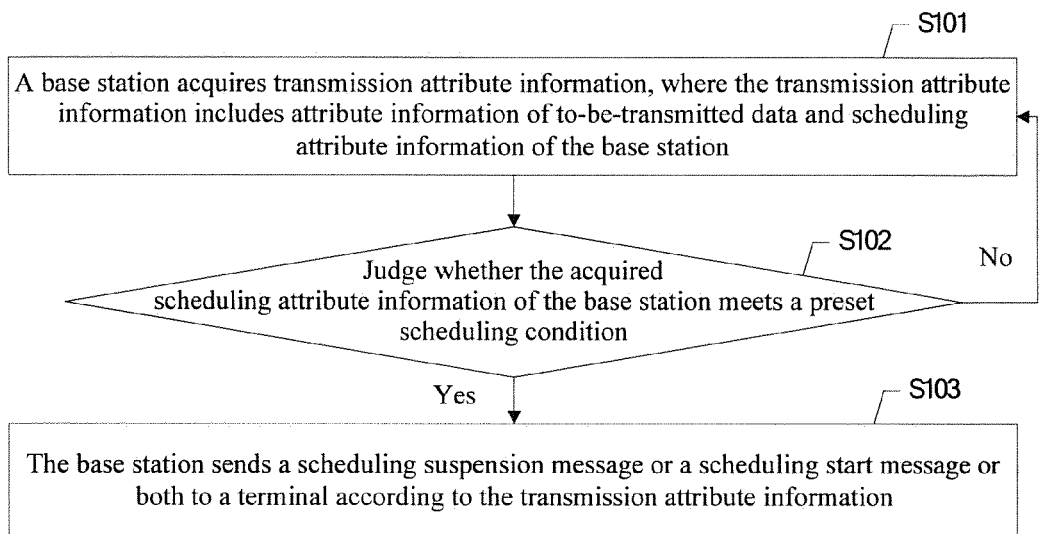
FIG. 1 is a flowchart of a method for controlling data transmission on a radio communication network according to an embodiment of the present invention.

As shown in FIG. 1, FIG. 1 is a flowchart of a method for controlling data transmission on a radio communication network according to an embodiment of the present invention. The embodiment of the present invention can be implemented on a base station. A process of this embodiment shown in the drawing includes:

S101: The base station acquires transmission attribute information, where the transmission attribute information includes attribute information of to-be-transmitted data and scheduling attribute information of the base station.

The attribute information of the to-be-transmitted data includes one or more of the following: terminal identifier information, terminal priority information, data amount information of the to-be-transmitted data, priority information of the to-be-transmitted data, and delay requirement information of the to-be-transmitted data. The scheduling attribute information of the base station includes one or more of the following: network resource usage, scheduling time information, and scheduling resource amount. The terminal identifier information may be a unique device identification code, for example, international mobile equipment identity (IMEI), international mobile subscriber identification Number (IMSI), or temporary mobile subscriber identity (TMSI). The data amount information of the to-be-transmitted data is total data amount of the to-be-transmitted data, for example, 10M Bytes or 1 G Bytes, and a total data amount range of the to-be-transmitted data is, for example, 1 G to 1.5 G Bytes. The delay requirement information of the to-be-transmitted data is delay tolerance of the to-be-transmitted data, for example, 4000 seconds, 100 seconds, or 30 seconds. The network resource usage is a percentage of currently occupied network resource. The scheduling time information is time required by the base station to schedule the to-be-transmitted data. The scheduling resource amount is the amount of scheduling resource provided by the base station for the to-be-transmitted data.

In a specific implementation, the base station can acquire the attribute information of the to-be-transmitted data from a terminal, from a multi-level scheduler, or locally, and the base station can locally acquire the scheduling attribute information of the base station. Optionally, that the base station acquires transmission attribute information specifically includes: the base station receives a transmission request message that includes the attribute information of the to-be-transmitted data and is sent by the terminal; or the base station receives a control message that includes the attribute information of the to-be-transmitted data and is sent by the multi-level scheduler (MLS); or the base station locally reads the attribute information of the to-be-transmitted data.

The base station may acquire attribute information of one or more pieces of the to-be-transmitted data; specifically, the base station may acquire attribute information of one or more pieces of the to-be-transmitted data of one terminal, or may acquire attribute information of to-be-transmitted data of a plurality of terminals.

S102: Judge whether the acquired scheduling attribute information of the base station meets a preset scheduling condition; if a judging result is yes, perform S103; and if a judging result is no, return to S101.

The preset scheduling condition may include a preset first scheduling condition and/or a preset second scheduling condition; where the preset first scheduling condition includes but is not limited to: the network resource usage is greater than a preset first threshold value; and the preset second scheduling condition includes but is not limited to: the network resource usage is less than a preset second threshold value. Specifically, the judging whether the acquired scheduling attribute information of the base station meets a preset scheduling condition may include: judging whether the acquired scheduling attribute information of the base station meets the preset first scheduling condition, or judging whether the acquired scheduling attribute information of the base station meets the preset second scheduling condition, or judging whether the acquired scheduling attribute information of the base station meets the preset first scheduling condition at first time and judging whether the acquired scheduling attribute information of the base station meets the preset second scheduling condition at second time.

S103: The base station sends a scheduling suspension message and/or a scheduling start message to a terminal according to the transmission attribute information.

If the judgment result in S102 is yes, that is, judging that the acquired scheduling attribute information of the base station meets the preset scheduling condition, the base station sends the scheduling suspension message/the scheduling start message to the terminal according to the transmission attribute information. Specifically, if the acquired scheduling attribute information of the base station meets the preset first scheduling condition, the base station sends the scheduling suspension message to the terminal according to the transmission attribute information, so that the terminal suspends sending of a resource request to the base station according to the scheduling suspension message; if the acquired scheduling attribute information of the base station meets the preset second scheduling condition, the base station sends the scheduling start message to the terminal according to the transmission attribute information and starts allocating transmission resource for the to-be-transmitted data.

When the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

Optionally, the scheduling suspension message may include a connection release message or a scheduling request suspension message.

Optionally, the scheduling suspension message may further include attribute information of a scheduling suspension object, where the attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

When the acquired scheduling attribute information of the base station meets the preset second scheduling condition, the plurality of pieces of acquired transmission attribute information is compared; if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, the corresponding terminal identifier information is determined and the scheduling start message is sent to a terminal corresponding to the terminal identifier information. Optionally, if attribute information of only one piece of the to-be-transmitted data is acquired, it is determined that the terminal priority information in the attribute information of the to-be-transmitted data is the highest priority, or the data amount information of the to-be-transmitted data is the minimum data amount, or the priority information of the to-be-transmitted data is the highest priority, or the delay requirement information of the to-be-transmitted data is the lowest delay tolerance, and accordingly, it is determined that the scheduling time information in the scheduling attribute information of the base station is the shortest time information, or the scheduling resource amount is the maximum resource amount.

Optionally, the scheduling start message may include resource allocation indication information for the to-be-transmitted data sent by the base station to the terminal or a resource allocation message for the to-be-transmitted data sent by the base station to the terminal.

Optionally, the scheduling start message may further include attribute information of a scheduling start object, where the attribute information of the scheduling start object includes one or more of the following: terminal identifier information of the scheduling start object, data type of the scheduling start object, priority information of the scheduling start object, terminal priority information of the scheduling start object, and delay information of the scheduling start object.

The foregoing technical solution provides a method for controlling data transmission on a radio communication network. A base station can send a scheduling suspension message and/or a scheduling start message to a terminal according to acquired transmission attribute information; if the scheduling suspension message is sent to the terminal, the terminal can suspend sending of a resource request to the base station according to the scheduling suspension message; if the scheduling start message is sent to the terminal, the transmission resource can start to be allocated for to-be-transmitted data. By using the embodiment of the present invention, data resource of the radio communication network can be scheduled according to the transmission attribute information, thereby avoiding a situation in which the base station is congested, reducing scheduling time, and improving the data transmission efficiency of the radio communication network.

Figure 2:
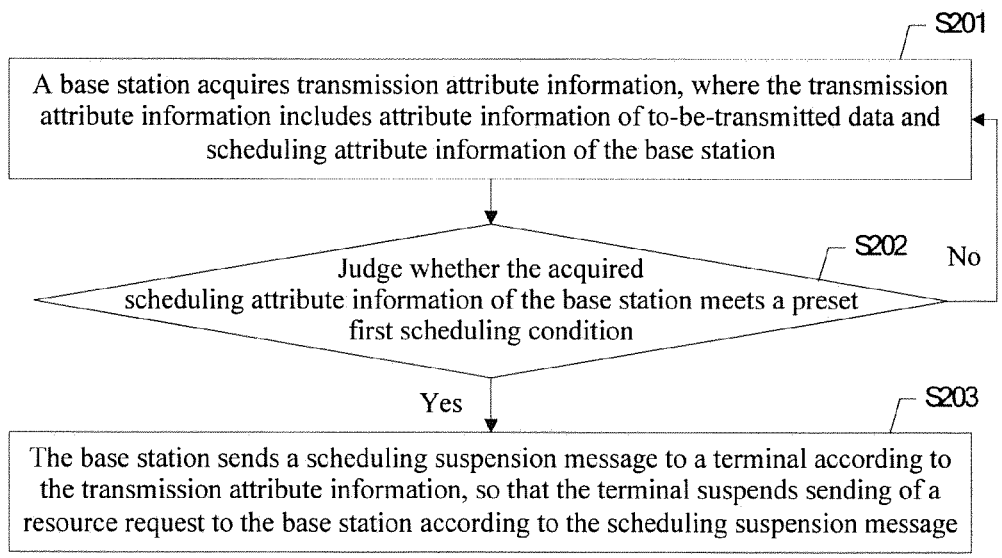
FIG. 2 is a flowchart of a method for controlling data transmission on a radio communication network according to a first embodiment of the present invention.

Optionally, as shown in FIG. 2, FIG. 2 is a flowchart of a method for controlling data transmission on a radio communication network according to a first embodiment of the present invention. The embodiment of the present invention can be implemented on a base station. A process of this embodiment shown in the drawing includes S201 to S203.

S201: The base station acquires transmission attribute information, where the transmission attribute information includes attribute information of to-be-transmitted data and scheduling attribute information of the base station.

The attribute information of the to-be-transmitted data includes one or more of the following: terminal identifier information, terminal priority information, data amount information of the to-be-transmitted data, priority information of the to-be-transmitted data, and delay requirement information of the to-be-transmitted data. The scheduling attribute information of the base station includes one or more of the following: network resource usage, scheduling time information, and scheduling resource amount.

S202: Judge whether the acquired scheduling attribute information of the base station meets a preset first scheduling condition; if a judging result is yes, perform S203; and if a judging result is no, return to S201.

The preset first scheduling condition includes but is not limited to: the network resource usage is greater than a preset first threshold value.

S203: The base station sends a scheduling suspension message to a terminal according to the transmission attribute information, so that the terminal suspends sending of a resource request to the base station according to the scheduling suspension message.

When the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

The foregoing technical solution provides a method for controlling data transmission on a radio communication network. A base station can send a scheduling suspension message to a terminal according to acquired transmission attribute information, for example, send the scheduling suspension message for to-be-transmitted data corresponding to the transmission attribute information including that priority information of a to-be-suspended terminal is the lowest priority, or data amount information of the to-be-transmitted data is the maximum data amount, or priority information of the to-be-transmitted data is the lowest priority, or delay requirement information of the to-be-transmitted data is the highest delay tolerance, or scheduling time information is the longest time information, or scheduling resource amount is the minimum resource amount, to suspend scheduling of the to-be-transmitted data with the transmission priority information, thereby avoiding a situation in which the base station is congested, reducing scheduling time, and improving the data transmission efficiency of the radio communication network.

Figure 3:
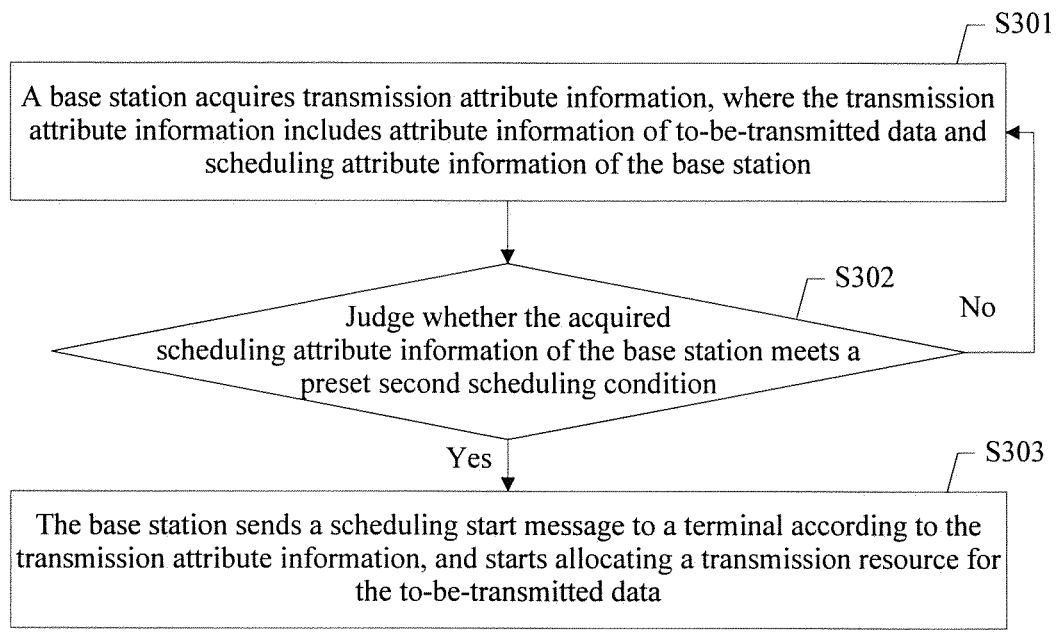
FIG. 3 is a flowchart of a method for controlling data transmission on a radio communication network according to a second embodiment of the present invention.

Optionally, as shown in FIG. 3, FIG. 3 is a flowchart of a method for controlling data transmission on a radio communication network according to a second embodiment of the present invention. The embodiment of the present invention can be implemented on a base station. A process of this embodiment shown in the drawing includes S301 to S303.

S301: The base station acquires transmission attribute information, where the transmission attribute information includes attribute information of to-be-transmitted data and scheduling attribute information of the base station.

The attribute information of the to-be-transmitted data includes one or more of the following: terminal identifier information, terminal priority information, data amount information of the to-be-transmitted data, priority information of the to-be-transmitted data, and delay requirement information of the to-be-transmitted data. The scheduling attribute information of the base station includes one or more of the following: network resource usage, scheduling time information, and scheduling resource amount.

S302: Judge whether the acquired scheduling attribute information of the base station meets a preset second scheduling condition; if a judging result is yes, perform S303; and if a judging result is no, return to S301.

The preset second scheduling condition includes but is not limited to: the network resource usage is less than a preset second threshold value.

S303: The base station sends a scheduling start message to a terminal according to the transmission attribute information, and starts allocating transmission resource for the to-be-transmitted data.

When the acquired scheduling attribute information of the base station meets the preset second scheduling condition, the plurality of pieces of acquired transmission attribute information is compared; if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, the corresponding terminal identifier information is determined and the scheduling start message is sent to a terminal corresponding to the terminal identifier information. Optionally, if attribute information of only one piece of the to-be-transmitted data is acquired, it is determined that the terminal priority information in the attribute information of the to-be-transmitted data is the highest priority, or the data amount information of the to-be-transmitted data is the minimum data amount, or the priority information of the to-be-transmitted data is the highest priority, or the delay requirement information of the to-be-transmitted data is the lowest delay tolerance, and accordingly, it is determined that the scheduling time information in the scheduling attribute information of the base station is the shortest time information, or the scheduling resource amount is the maximum resource amount.

The foregoing technical solution provides a method for controlling data transmission on a radio communication network. A base station can send a scheduling start message to a terminal according to acquired transmission attribute information, for example, send the scheduling start message for to-be-transmitted data corresponding to the transmission attribute information including that priority information of a to-be-suspended terminal is the highest priority, or data amount information of the to-be-transmitted data is the minimum data amount, or priority information of the to-be-transmitted data is the highest priority, or delay requirement information of the to-be-transmitted data is the lowest delay tolerance, or scheduling time information is the shortest time information, or scheduling resource amount is the maximum resource amount, to start scheduling the to-be-transmitted data with the transmission priority information, thereby avoiding a situation in which the base station is congested, reducing scheduling time, and improving the data transmission efficiency of the radio communication network.

Figure 4:
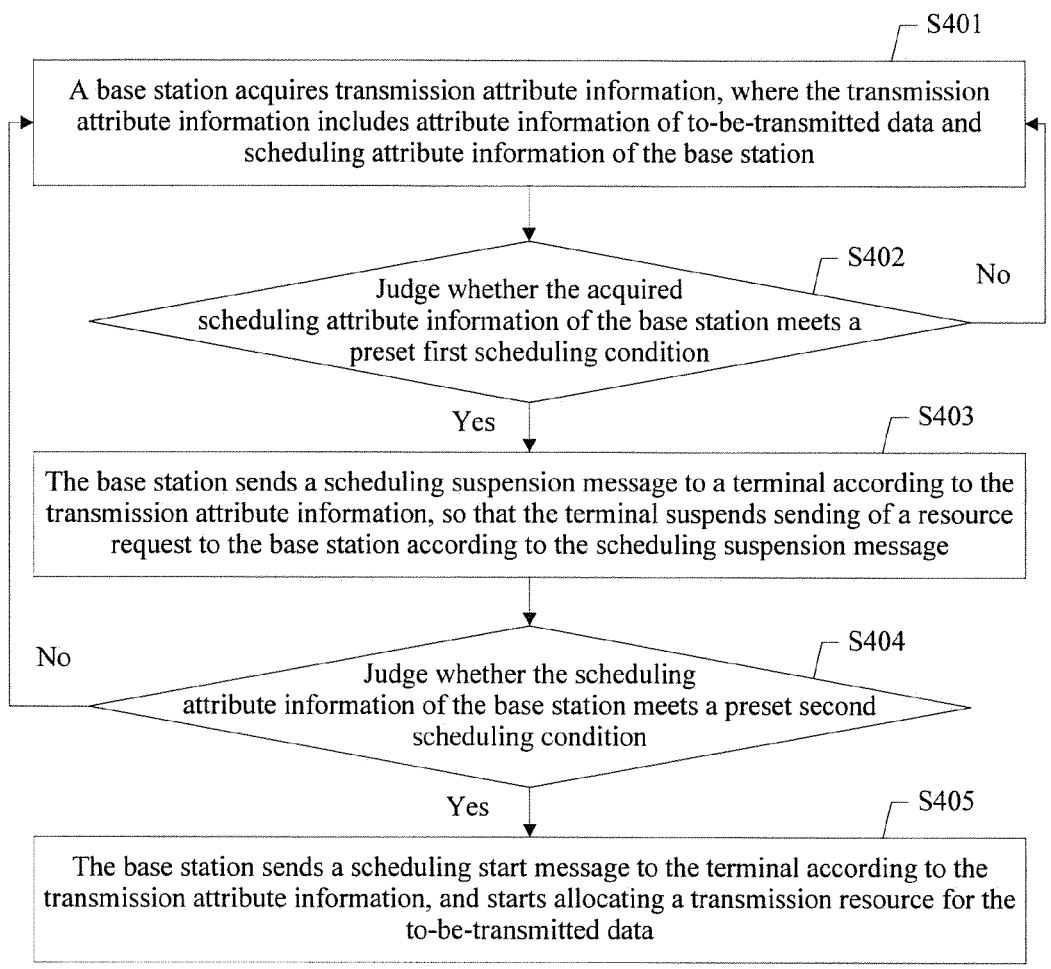
FIG. 4 is a flowchart of a method for controlling data transmission on a radio communication network according to a third embodiment of the present invention.

Optionally, as shown in FIG. 4, FIG. 4 is a flowchart of a method for controlling data transmission on a radio communication network according to a third embodiment of the present invention. The embodiment of the present invention can be implemented on a base station. A process of this embodiment shown in the drawing includes S401 to S405.

S401: The base station acquires transmission attribute information, where the transmission attribute information includes attribute information of to-be-transmitted data and scheduling attribute information of the base station.

S402: Judge whether the acquired scheduling attribute information of the base station meets a preset first scheduling condition; If a judging result is yes, perform S403; and if a judging result is no, return to S401.

The preset first scheduling condition includes but is not limited to: network resource usage is greater than a preset first threshold value.

S403: The base station sends a scheduling suspension message to a terminal according to the transmission attribute information, so that the terminal suspends sending of a resource request to the base station according to the scheduling suspension message.

When the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

S404: Judge whether the scheduling attribute information of the base station meets a preset second scheduling condition; If a judging result is yes, perform S405; and if a judging result is no, return to S401.

The preset second scheduling condition includes but is not limited to: network resource usage is less than a preset second threshold value.

S405: The base station sends a scheduling start message to the terminal according to the transmission attribute information, and starts allocating transmission resource for the to-be-transmitted data.

When the acquired scheduling attribute information of the base station meets the preset second scheduling condition, the plurality of pieces of acquired transmission attribute information is compared; if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, the corresponding terminal identifier information is determined and the scheduling start message is sent to a terminal corresponding to the terminal identifier information. Optionally, if attribute information of only one piece of the to-be-transmitted data is acquired, it is determined that the terminal priority information in the attribute information of the to-be-transmitted data is the highest priority, or the data amount information of the to-be-transmitted data is the minimum data amount, or the priority information of the to-be-transmitted data is the highest priority, or the delay requirement information of the to-be-transmitted data is the lowest delay tolerance, and accordingly, it is determined that the scheduling time information in the scheduling attribute information of the base station is the shortest time information, or the scheduling resource amount is the maximum resource amount.

Further optionally, the implementation of S402 to S403 and S404 to S405 does not have a sequence. Either group can be implemented first, for example, S402 to S403 are implemented first and then S404 to S405 are implemented, or S402 to S403 are implemented first and then S404 to S405 are implemented.

The foregoing technical solution provides a method for controlling data transmission on a radio communication network. When scheduling attribute information of a base station meets a preset first scheduling condition, the base station can send a scheduling suspension message to a terminal according to acquired transmission attribute information; when scheduling attribute information of a base station meets a preset second scheduling condition, the base station can send a scheduling start message to a terminal according to transmission attribute information, thereby suspending scheduling and starting scheduling according to the transmission attribute information, avoiding a situation in which the base station is congested, reducing scheduling time, and improving the data transmission efficiency of the radio communication network.

Figure 5:
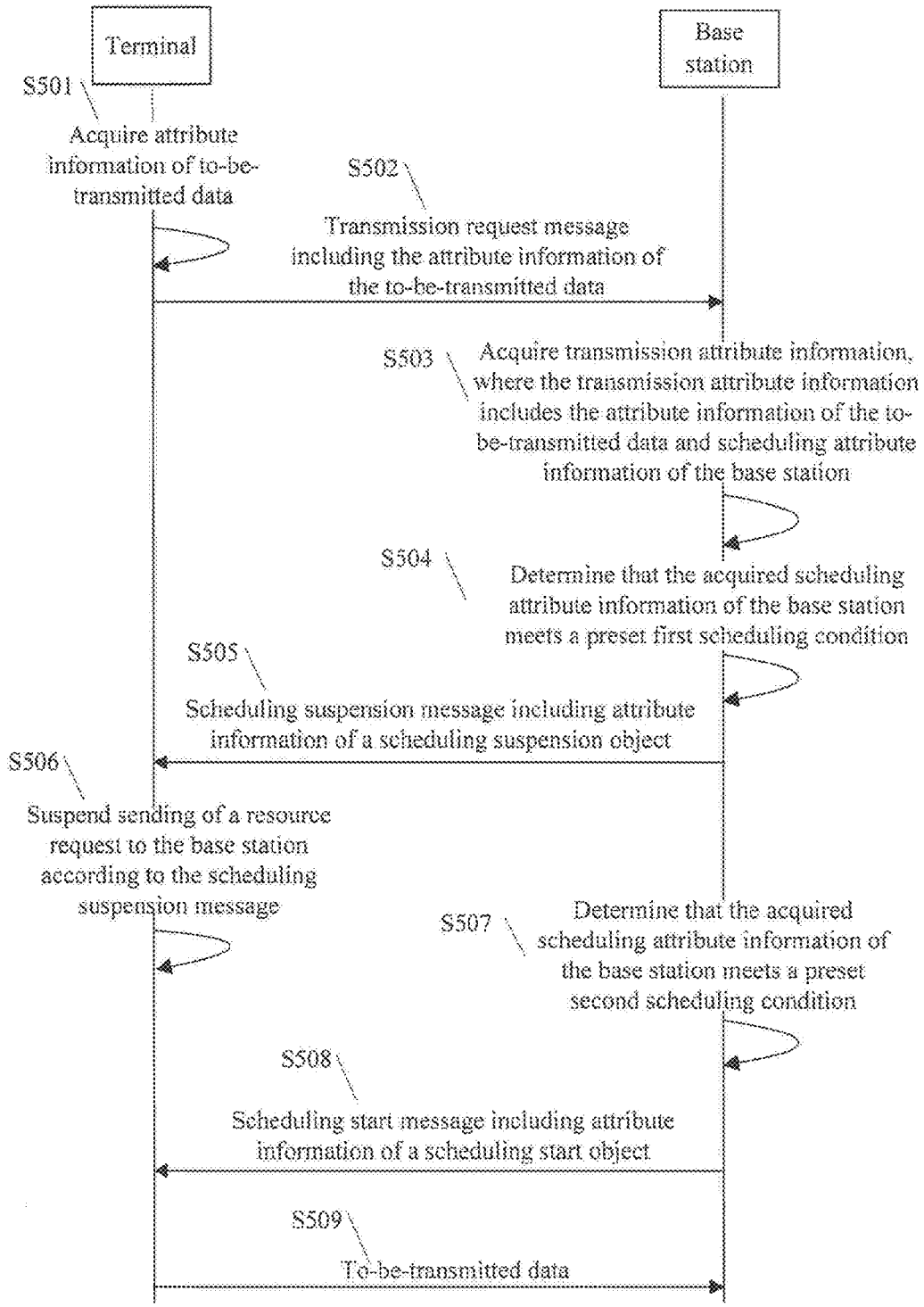
FIG. 5 is a flowchart of a method for controlling data transmission on a radio communication network according to a fourth embodiment of the present invention.

Optionally, as shown in FIG. 5, FIG. 5 is a flowchart of a method for controlling data transmission on a radio communication network according to a fourth embodiment of the present invention. A process of this embodiment shown in the drawing includes S501 to S509.

S501: A terminal acquires attribute information of to-be-transmitted data.

The terminal acquires attribute information of at least one piece of the to-be-transmitted data, where the attribute information of the to-be-transmitted data includes one or more of the following: terminal identifier information, terminal priority information, data amount information of the to-be-transmitted data, priority information of the to-be-transmitted data, and delay requirement information of the to-be-transmitted data.

S502: The terminal sends a transmission request message to a base station, where the transmission request message includes the attribute information of the to-be-transmitted data.

The transmission request message may be an RRC connection request, and the transmission request message includes the attribute information of the to-be-transmitted data. After the terminal sends the RRC connection request to the base station, the base station sends an RRC connection establishment message to the terminal. Therefore, the terminal and the base station establish an RRC connection. The base station sends an RRC connection reconfiguration message to the terminal. The terminal configures a radio bearer according to the RRC connection reconfiguration message and sends an RRC connection reconfiguration completion message to the base station. Therefore, the terminal and the base station establish an RRC connection bearer.

Optionally, one or more terminals may send the transmission request message to the base station, or one terminal sends transmission request messages corresponding to different pieces of the to-be-transmitted data to the base station.

S503: The base station acquires the transmission attribute information, where the transmission attribute information includes the attribute information of the to-be-transmitted data and scheduling attribute information of the base station.

The base station acquires the attribute information of the to-be-transmitted data from the received transmission request message and stores the attribute information of the to-be-transmitted data. The base station locally acquires the scheduling attribute information of the base station, where the scheduling attribute information of the base station includes one or more of the following: network resource usage, scheduling time information, and scheduling resource amount.

Optionally, the base station may acquire attribute information of one or more pieces of the to-be-transmitted data; specifically, the base station may acquire attribute information of one or more pieces of the to-be-transmitted data of one terminal, or may acquire attribute information of to-be-transmitted data of a plurality of terminals.

S504: The base station determines that the acquired scheduling attribute information of the base station meets a preset first scheduling condition.

The preset first scheduling condition includes but is not limited to: the network resource usage is greater than a preset first threshold value.

S505: The base station sends a scheduling suspension message to the terminal according to the transmission attribute information, where the scheduling suspension message includes attribute information of a scheduling suspension object.

When the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

The scheduling suspension message includes the attribute information of the scheduling suspension object, where the attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

Optionally, the scheduling suspension object may be at least one piece of the to-be-transmitted data of one terminal, may also be all to-be-transmitted data of one terminal, and may also be to-be-transmitted data of a plurality of terminals.

Optionally, the scheduling suspension message includes a connection release message or a scheduling request suspension message.

S506: The terminal suspends sending of a resource request to the base station according to the scheduling suspension message.

After the terminal receives the scheduling suspension message, the terminal suspends sending of the resource request to the base station according to the attribute information of the scheduling suspension object, where the scheduling suspension message includes the attribute information of the scheduling suspension object; and when detecting that the attribute information of the to-be-transmitted data is the same as the attribute information of the scheduling suspension object, or the priority information of the to-be-transmitted data is lower than the data priority information of the scheduling suspension object, or the terminal priority information is lower than the terminal priority information of the scheduling suspension object, or the delay requirement information of the to-be-transmitted data is higher than the data delay information of the scheduling suspension object, suspends sending of the resource request for the to-be-transmitted data.

Optionally, when the terminal priority information is equal to or lower than the terminal priority information of the scheduling suspension object, it may be: the terminal suspends sending of resource requests for all the to-be-transmitted data of the terminal; and it may also be: the terminal suspends sending of a resource request for at least one piece of the to-be-transmitted data of the terminal.

S507: The base station determines that the acquired scheduling attribute information of the base station meets a preset second scheduling condition.

The preset second scheduling condition includes but is not limited to: the network resource usage is less than a preset second threshold value.

S508: The base station sends a scheduling start message to the terminal according to the transmission attribute information, where the scheduling start message includes attribute information of a scheduling start object.

The attribute information of the scheduling start object includes one or more of the following: terminal identifier information of the scheduling start object, data type of the scheduling start object, priority information of the scheduling start object, terminal priority information of the scheduling start object, and delay information of the scheduling start object.

Optionally, the scheduling start message may include resource allocation indication information for the to-be-transmitted data sent by the base station to the terminal or a resource allocation message for the to-be-transmitted data sent by the base station to the terminal.

S509: The terminal sends the to-be-transmitted data to the base station according to the scheduling start message.

After receiving the scheduling start message, the terminal sends the to-be-transmitted data to the base station according to the scheduling start message; and when detecting that the attribute information of the to-be-transmitted data is the same as the attribute information of the scheduling start object, or the priority information of the to-be-transmitted data is higher than the data priority information of the scheduling suspension object, or the terminal priority information is higher than the terminal priority information of the scheduling suspension object, or the delay requirement information of the to-be-transmitted data is lower than the data delay information of the scheduling suspension object, sends the to-be-transmitted data to the base station.

Optionally, when the terminal priority information is equal to or higher than the terminal priority information of the scheduling start object, it may be: start sending all the to-be-transmitted data of the terminal; and it may also be: start sending at least one piece of the to-be-transmitted data of the terminal.

The foregoing technical solution provides a method for controlling data transmission on a radio communication network. When scheduling attribute information of a base station meets a preset first scheduling condition, the base station can send a scheduling suspension message to a terminal according to acquired transmission attribute information, so that the terminal suspends sending of a resource request to the base station; when scheduling attribute information of a base station meets a preset second scheduling condition, the base station can send a scheduling start message to a terminal according to transmission attribute information, so that the terminal sends to-be-transmitted data to the base station, thereby suspending scheduling and starting scheduling according to the transmission attribute information, avoiding a situation in which the base station is congested, reducing scheduling time, and improving the data transmission efficiency of the radio communication network.

Figure 6:
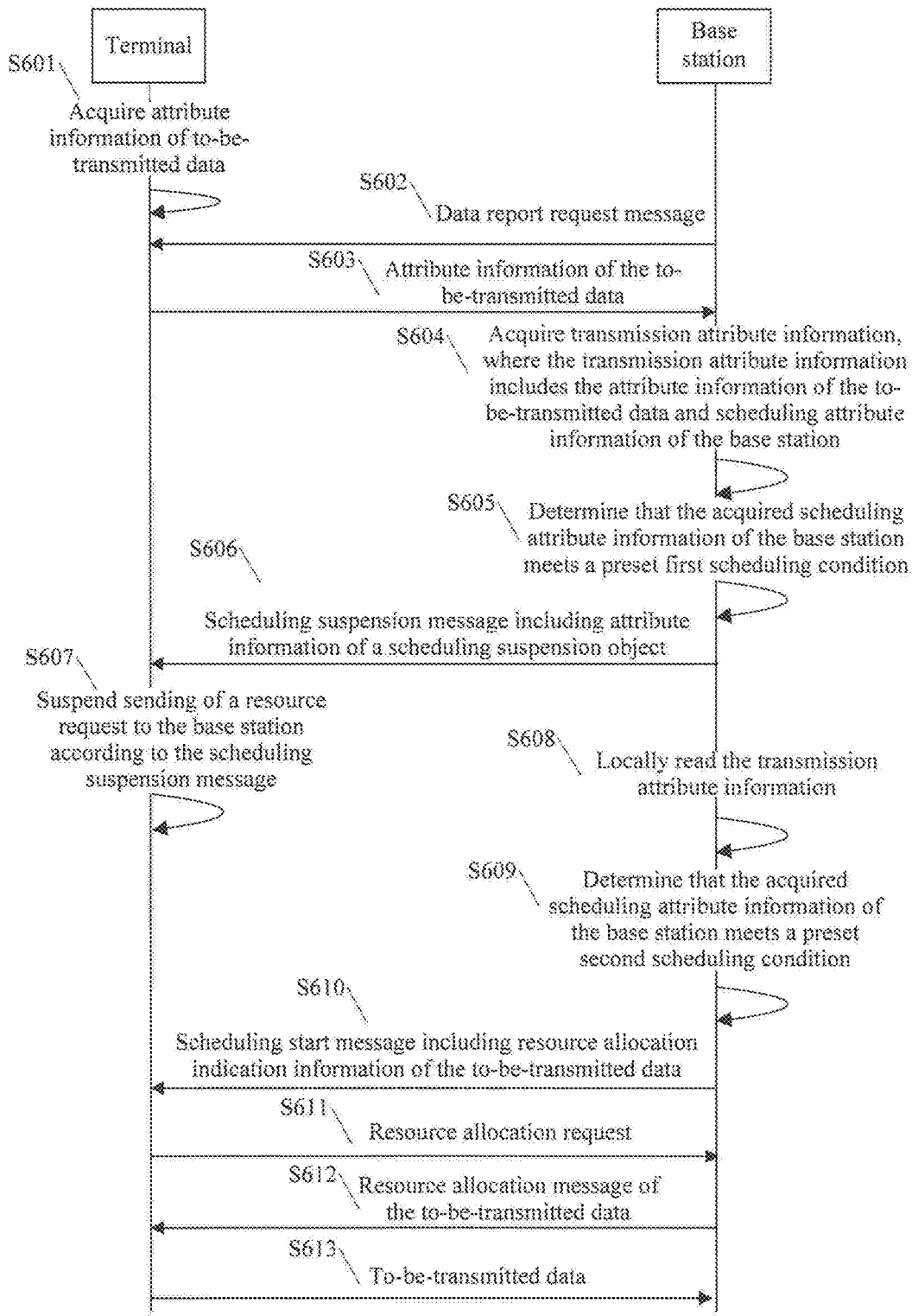
FIG. 6 is a flowchart of a method for controlling data transmission on a radio communication network according to a fifth embodiment of the present invention.

Optionally, as shown in FIG. 6, FIG. 6 is a flowchart of a method for controlling data transmission on a radio communication network according to a fifth embodiment of the present invention. A process of this embodiment shown in the drawing includes S601 to S613.

S601: A terminal acquires attribute information of to-be-transmitted data.

The terminal acquires attribute information of at least one piece of the to-be-transmitted data, where the attribute information of the to-be-transmitted data includes one or more of the following: terminal identifier information, terminal priority information, data amount information of the to-be-transmitted data, priority information of the to-be-transmitted data, and delay requirement information of the to-be-transmitted data.

S602: A base station sends a data report request message to the terminal.

S603: The terminal reports the attribute information of the to-be-transmitted data to the base station according to the data report request message.

S604: The base station acquires the transmission attribute information, where the transmission attribute information includes the attribute information of the to-be-transmitted data and scheduling attribute information of the base station.

The base station receives the attribute information of the to-be-transmitted data, where the attribute information is reported by the terminal, and acquires and stores the attribute information of the to-be-transmitted data. The base station locally acquires the scheduling attribute information of the base station, where the scheduling attribute information of the base station includes one or more of the following: network resource usage, scheduling time information, and scheduling resource amount.

Optionally, the base station may acquire attribute information of one or more pieces of the to-be-transmitted data; specifically, the base station may acquire attribute information of one or more pieces of the to-be-transmitted data of one terminal, or may acquire attribute information of to-be-transmitted data of a plurality of terminals.

S605: The base station determines that the acquired scheduling attribute information of the base station meets a preset first scheduling condition.

The preset first scheduling condition includes but is not limited to: the network resource usage is greater than a preset first threshold value.

S606: The base station sends a scheduling suspension message to the terminal according to the transmission attribute information, where the scheduling suspension message includes attribute information of a scheduling suspension object.

When the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

The scheduling suspension message includes the attribute information of the scheduling suspension object, where the attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

Optionally, the scheduling suspension object may be at least one piece of the to-be-transmitted data of one terminal, may also be all to-be-transmitted data of one terminal, and may also be to-be-transmitted data of a plurality of terminals.

Optionally, the scheduling suspension message includes a connection release message or a scheduling request suspension message.

S607: The terminal suspends sending of a resource request to the base station according to the scheduling suspension message.

After the terminal receives the scheduling suspension message, the terminal suspends sending of the resource request to the base station according to the attribute information of the scheduling suspension object, where the scheduling suspension message includes the attribute information of the scheduling suspension object; and when detecting that the attribute information of the to-be-transmitted data is the same as the attribute information of the scheduling suspension object, or the priority information of the to-be-transmitted data is lower than the data priority information of the scheduling suspension object, or the terminal priority information is lower than the terminal priority information of the scheduling suspension object, or the delay requirement information of the to-be-transmitted data is higher than the data delay information of the scheduling suspension object, suspends sending of the resource request for the to-be-transmitted data.

Optionally, when the terminal priority information is equal to or lower than the terminal priority information of the scheduling suspension object, it may be: the terminal suspends sending of resource requests for all the to-be-transmitted data of the terminal; and it may also be: the terminal suspends sending of a resource request for at least one piece of the to-be-transmitted data of the terminal.

S608: The base station locally reads the transmission attribute information.

The transmission attribute information has been acquired in S604, and the transmission attribute information is directly locally read in S608.

S609: The base station determines that the read scheduling attribute information of the base station meets a preset second scheduling condition.

The preset second scheduling condition includes but is not limited to: the network resource usage is less than a preset second threshold value.

S610: The base station sends a scheduling start message to the terminal according to the transmission attribute information, where the scheduling start message includes resource allocation indication information of the to-be-transmitted data.

Optionally, the scheduling start message may further include attribute information of a scheduling start object. The attribute information of the scheduling start object includes one or more of the following: terminal identifier information of the scheduling start object, data type of the scheduling start object, priority information of the scheduling start object, terminal priority information of the scheduling start object, and delay information of the scheduling start object.

S611: The terminal sends a resource allocation request to the base station according to the resource allocation indication information of the to-be-transmitted data.

After receiving the scheduling start message, the terminal sends the resource allocation request to the base station according to the scheduling start message; and when detecting that the attribute information of the to-be-transmitted data is the same as the attribute information of the scheduling start object, or the priority information of the to-be-transmitted data is higher than the data priority information of the scheduling suspension object, or the terminal priority information is higher than the terminal priority information of the scheduling suspension object, or the delay requirement information of the to-be-transmitted data is lower than the data delay information of the scheduling suspension object, sends the resource allocation request for the to-be-transmitted data to the base station.

Optionally, when the terminal priority information is equal to or higher than the terminal priority information of the scheduling start object, it may be: start sending resource allocation requests for all the to-be-transmitted data of the terminal; and it may also be: start sending a resource allocation request for at least one piece of the to-be-transmitted data of the terminal.

S612: The base station sends a resource allocation message of the to-be-transmitted data to the terminal according to the resource allocation request.

S613: The terminal sends the to-be-transmitted data to the base station according to the resource allocation message of the to-be-transmitted data.

The foregoing technical solution provides a method for controlling data transmission on a radio communication network. A base station can instruct a terminal to report attribute information of to-be-transmitted data and send a scheduling suspension message/a scheduling start message to the terminal according to acquired transmission attribute information, thereby implementing scheduling according to the transmission attribute information, avoiding a situation in which the base station is congested, reducing scheduling time, and improving the data transmission efficiency of the radio communication network.

Figure 7:
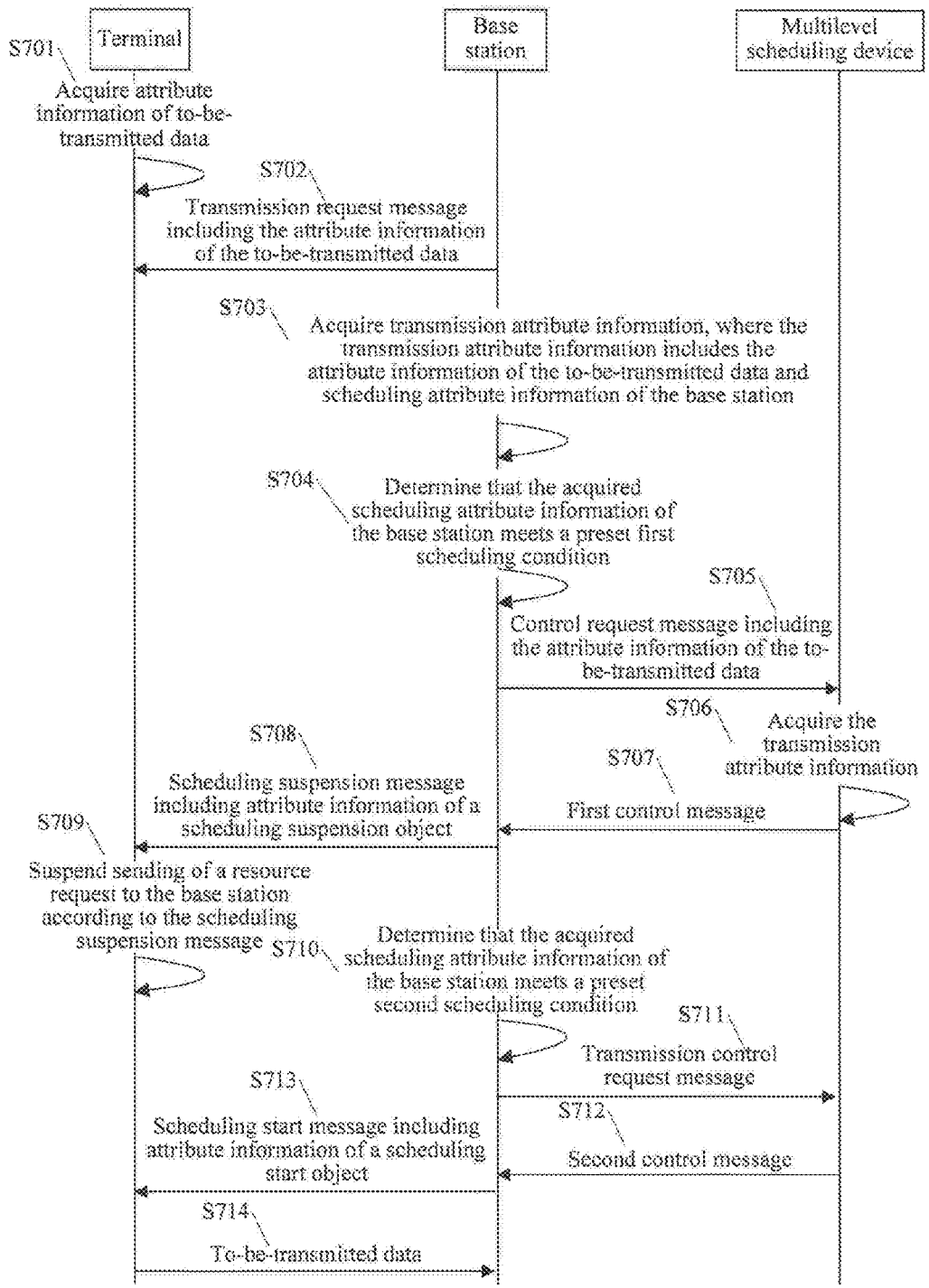
FIG. 7 is a flowchart of a method for controlling data transmission on a radio communication network according to a sixth embodiment of the present invention.

Optionally, as shown in FIG. 7, FIG. 7 is a flowchart of a method for controlling data transmission on a radio communication network according to a sixth embodiment of the present invention. A process of this embodiment shown in the drawing includes S701 to S714.

S701: A terminal acquires attribute information of to-be-transmitted data.

The terminal acquires attribute information of at least one piece of the to-be-transmitted data, where the attribute information of the to-be-transmitted data includes one or more of the following: terminal identifier information, terminal priority information, data amount information of the to-be-transmitted data, priority information of the to-be-transmitted data, and delay requirement information of the to-be-transmitted data.

S702: The terminal sends a transmission request message to a base station, where the transmission request message includes the attribute information of the to-be-transmitted data.

The transmission request message may be an RRC connection request, and the transmission request message includes the attribute information of the to-be-transmitted data. After the terminal sends the RRC connection request to the base station, the base station sends an RRC connection establishment message to the terminal. Therefore, the terminal and the base station establish an RRC connection. The base station sends an RRC connection reconfiguration message to the terminal. The terminal configures a radio bearer according to the RRC connection reconfiguration message and sends an RRC connection reconfiguration completion message to the base station. Therefore, the terminal and the base station establish an RRC connection bearer.

Optionally, one or more terminals may send the transmission request message to the base station, or one terminal sends transmission request messages corresponding to different pieces of the to-be-transmitted data to the base station.

S703: The base station acquires the transmission attribute information, where the transmission attribute information includes the attribute information of the to-be-transmitted data and scheduling attribute information of the base station.

The base station acquires the attribute information of the to-be-transmitted data from the received transmission request message and stores the attribute information of the to-be-transmitted data. The base station locally acquires the scheduling attribute information of the base station, where the scheduling attribute information of the base station includes one or more of the following: network resource usage, scheduling time information, and scheduling resource amount.

Optionally, the base station may acquire attribute information of one or more pieces of the to-be-transmitted data; specifically, the base station may acquire attribute information of one or more pieces of the to-be-transmitted data of one terminal, or may acquire attribute information of to-be-transmitted data of a plurality of terminals.

S704: The base station determines that the acquired scheduling attribute information of the base station meets a preset first scheduling condition.

The preset first scheduling condition includes but is not limited to: the network resource usage is greater than a preset first threshold value.

S705: The base station sends a control request message to a multi-level scheduler, where the control request message includes the transmission attribute information.

The base station sends the control request message to the multi-level scheduler MLS, where the control request message includes the attribute information of the to-be-transmitted data and the scheduling attribute information of the base station.

S706: The multi-level scheduler acquires the transmission attribute information according to the control request message.

After receiving the control request message, the multi-level scheduler acquires the transmission attribute information from the control request message and stores the transmission attribute information.

S707: The multi-level scheduler sends a first control message to the base station according to the acquired transmission attribute information.

The sending, by the multi-level scheduler, a first control message to the base station according to the acquired transmission attribute information can specifically include:

if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, determining the corresponding terminal identifier information;

acquiring attribute information of a corresponding scheduling suspension object according to the determined terminal identifier information; and the multi-level scheduler sends the first control message to the base station, where the first control message includes the attribute information of the scheduling suspension object.

The attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

S708: The base station sends a scheduling suspension message to the terminal according to the first control message, where the scheduling suspension message includes the attribute information of the scheduling suspension object.

S709: The terminal suspends sending of a resource request to the base station according to the scheduling suspension message.

S710: The base station determines that the acquired scheduling attribute information of the base station meets a preset second scheduling condition.

The preset second scheduling condition includes but is not limited to: the network resource usage is less than a preset second threshold value.

S711: The base station sends a transmission control request message to the multi-level scheduler.

S712: The multi-level scheduler sends a second control message to the base station according to the transmission control request message.

The sending, by the multi-level scheduler, a second control message to the base station according to the transmission control request message can specifically include:

if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, determining the corresponding terminal identifier information;

acquiring attribute information of a corresponding scheduling start object according to the determined terminal identifier information; and the multi-level scheduler sends the second control message to the base station, where the second control message includes the attribute information of the scheduling start object.

The attribute information of the scheduling start object includes one or more of the following: terminal identifier information of the scheduling start object, data type of the scheduling start object, priority information of the scheduling start object, terminal priority information of the scheduling start object, and delay information of the scheduling start object.

S713: The base station sends a scheduling start message to the terminal according to the second control message, where the scheduling start message includes the attribute information of the scheduling start object.

S714: The terminal sends the to-be-transmitted data to the base station according to the scheduling start message.

The foregoing technical solution provides a method for controlling data transmission on a radio communication network. A base station can send a scheduling suspension message and/or scheduling start message to a terminal according to a control message sent by a multi-level scheduler, thereby implementing scheduling according to transmission attribute information, avoiding a situation in which the base station is congested, reducing scheduling time, and improving the data transmission efficiency of the radio communication network.

Figure 8:
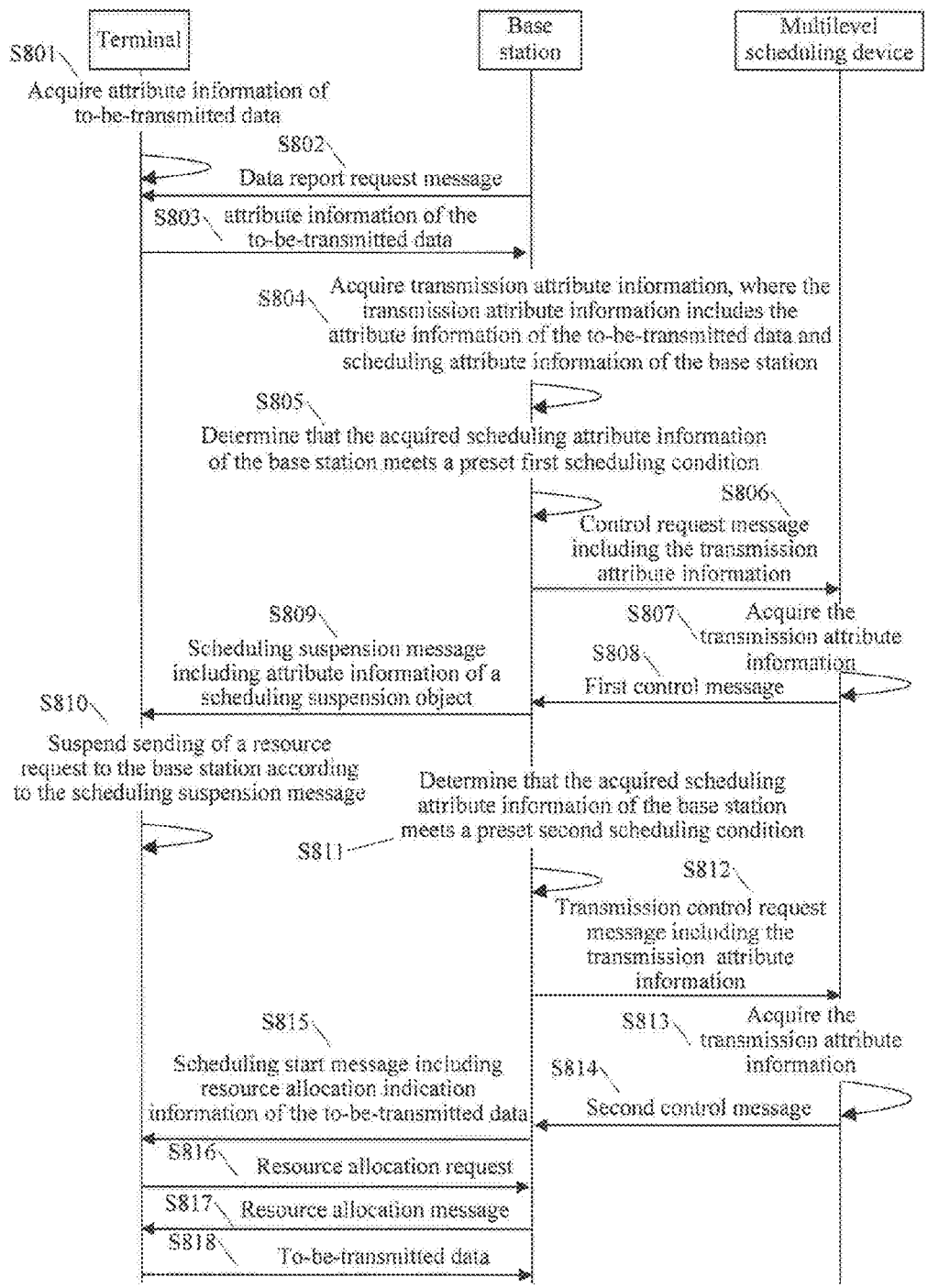
FIG. 8 is a flowchart of a method for controlling data transmission on a radio communication network according to a seventh embodiment of the present invention.

Optionally, as shown in FIG. 8, FIG. 8 is a flowchart of a method for controlling data transmission on a radio communication network according to a seventh embodiment of the present invention. A process of this embodiment shown in the drawing includes S801 to S817.

S801: A terminal acquires attribute information of to-be-transmitted data.

The terminal acquires attribute information of at least one piece of the to-be-transmitted data, where the attribute information of the to-be-transmitted data includes one or more of the following: terminal identifier information, terminal priority information, data amount information of the to-be-transmitted data, priority information of the to-be-transmitted data, and delay requirement information of the to-be-transmitted data.

S802: A base station sends a data report request message to the terminal.

S803: The terminal reports the attribute information of the to-be-transmitted data to the base station according to the data report request message.

S804: The base station acquires the transmission attribute information, where the transmission attribute information includes the attribute information of the to-be-transmitted data and scheduling attribute information of the base station.

The base station acquires the attribute information of the to-be-transmitted data from the received transmission request message and stores the attribute information of the to-be-transmitted data. The base station locally acquires the scheduling attribute information of the base station, where the scheduling attribute information of the base station includes one or more of the following: network resource usage, scheduling time information, and scheduling resource amount.

Optionally, the base station may acquire attribute information of one or more pieces of the to-be-transmitted data; specifically, the base station may acquire attribute information of one or more pieces of the to-be-transmitted data of one terminal, or may acquire attribute information of to-be-transmitted data of a plurality of terminals.

S805: The base station determines that the acquired scheduling attribute information of the base station meets a preset first scheduling condition.

The preset first scheduling condition includes but is not limited to: the network resource usage is greater than a preset first threshold value.

S806: The base station sends a control request message to a multi-level scheduler, where the control request message includes the transmission attribute information.

S807: The multi-level scheduler acquires the transmission attribute information according to the control request message.

S808: The multi-level scheduler sends a first control message to the base station according to the acquired transmission attribute information.

The sending, by the multi-level scheduler, a first control message to the base station according to the acquired transmission attribute information can specifically include:

if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, determining the corresponding terminal identifier information;

acquiring attribute information of a corresponding scheduling suspension object according to the determined terminal identifier information; and the multi-level scheduler sends the first control message to the base station, where the first control message includes the attribute information of the scheduling suspension object.

The attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

S809: The base station sends a scheduling suspension message to the terminal according to the first control message, where the scheduling suspension message includes the attribute information of the scheduling suspension object.

S810: The terminal suspends sending of a resource request to the base station according to the scheduling suspension message.

After the terminal receives the scheduling suspension message, the terminal suspends sending of the resource request to the base station according to the attribute information of the scheduling suspension object, where the scheduling suspension message includes the attribute information of the scheduling suspension object; and when detecting that the attribute information of the to-be-transmitted data is the same as the attribute information of the scheduling suspension object, or the priority information of the to-be-transmitted data is lower than the data priority information of the scheduling suspension object, or the terminal priority information is lower than the terminal priority information of the scheduling suspension object, or the delay requirement information of the to-be-transmitted data is higher than the data delay information of the scheduling suspension object, suspends sending of the resource request for the to-be-transmitted data.

Optionally, when the terminal priority information is equal to or lower than the terminal priority information of the scheduling suspension object, it may be: the terminal suspends sending of resource requests for all the to-be-transmitted data of the terminal; and it may also be: the terminal suspends sending of a resource request for at least one piece of the to-be-transmitted data of the terminal.

S811: The base station determines that the acquired scheduling attribute information of the base station meets a preset second scheduling condition.

The preset second scheduling condition includes but is not limited to: the network resource usage is less than a preset second threshold value.

S812: The base station sends a transmission control request message to a multi-level scheduler, where the transmission control request message includes the transmission attribute information.

S813: The multi-level scheduler acquires the transmission attribute information according to the transmission control request message.

S814: The multi-level scheduler sends a second control message to the base station according to the acquired transmission attribute information.

The sending, by the multi-level scheduler, a second control message to the base station according to the transmission control request message can specifically include:

if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, determining the corresponding terminal identifier information;

acquiring attribute information of a corresponding scheduling start object according to the determined terminal identifier information; and the multi-level scheduler sends the second control message to the base station, where the second control message includes the attribute information of the scheduling start object.

The attribute information of the scheduling start object includes one or more of the following: terminal identifier information of the scheduling start object, data type of the scheduling start object, priority information of the scheduling start object, terminal priority information of the scheduling start object, and delay information of the scheduling start object.

S815: The base station sends a scheduling start message to the terminal according to the second control message, where the scheduling start message includes resource allocation indication information of the to-be-transmitted data.

Optionally, the scheduling start message may further include attribute information of a scheduling start object. The attribute information of the scheduling start object includes one or more of the following: terminal identifier information of the scheduling start object, data type of the scheduling start object, priority information of the scheduling start object, terminal priority information of the scheduling start object, and delay information of the scheduling start object.

S816: The terminal sends a resource allocation request to the base station according to the resource allocation indication information of the to-be-transmitted data.

After receiving the scheduling start message, the terminal sends the resource allocation request to the base station according to the scheduling start message; and when detecting that the attribute information of the to-be-transmitted data is the same as the attribute information of the scheduling start object, or the priority information of the to-be-transmitted data is higher than the data priority information of the scheduling suspension object, or the terminal priority information is higher than the terminal priority information of the scheduling suspension object, or the delay requirement information of the to-be-transmitted data is lower than the data delay information of the scheduling suspension object, sends the resource allocation request for the to-be-transmitted data to the base station.

Optionally, when the terminal priority information is equal to or higher than the terminal priority information of the scheduling start object, it may be: start sending resource allocation requests for all the to-be-transmitted data of the terminal; and it may also be: start sending a resource allocation request for at least one piece of the to-be-transmitted data of the terminal.

S817: The base station sends a resource allocation message of the to-be-transmitted data to the terminal according to the resource allocation request.

S818: The terminal sends the to-be-transmitted data to the base station according to the resource allocation message of the to-be-transmitted data.

The foregoing technical solution provides a method for controlling data transmission on a radio communication network. A base station can send a scheduling suspension message/a scheduling start message to a terminal according to a control message sent by a multi-level scheduler, thereby implementing scheduling according to transmission attribute information, avoiding a situation in which the base station is congested, reducing scheduling time, and improving the data transmission efficiency of the radio communication network.

Figure 9:
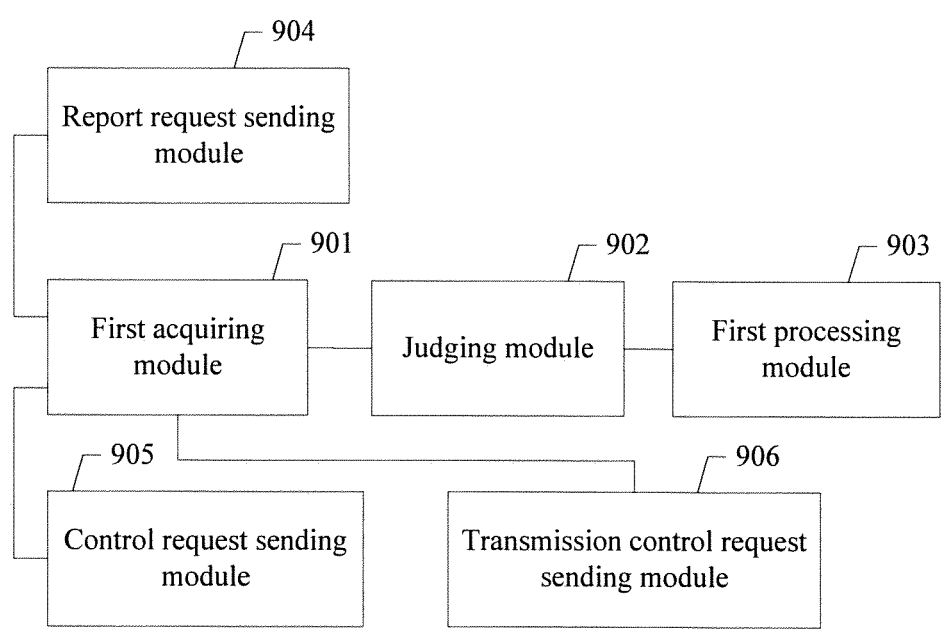
FIG. 9 is a schematic structural diagram of an apparatus for controlling data transmission on a radio communication network according to an embodiment of the present invention.
Figure 10:
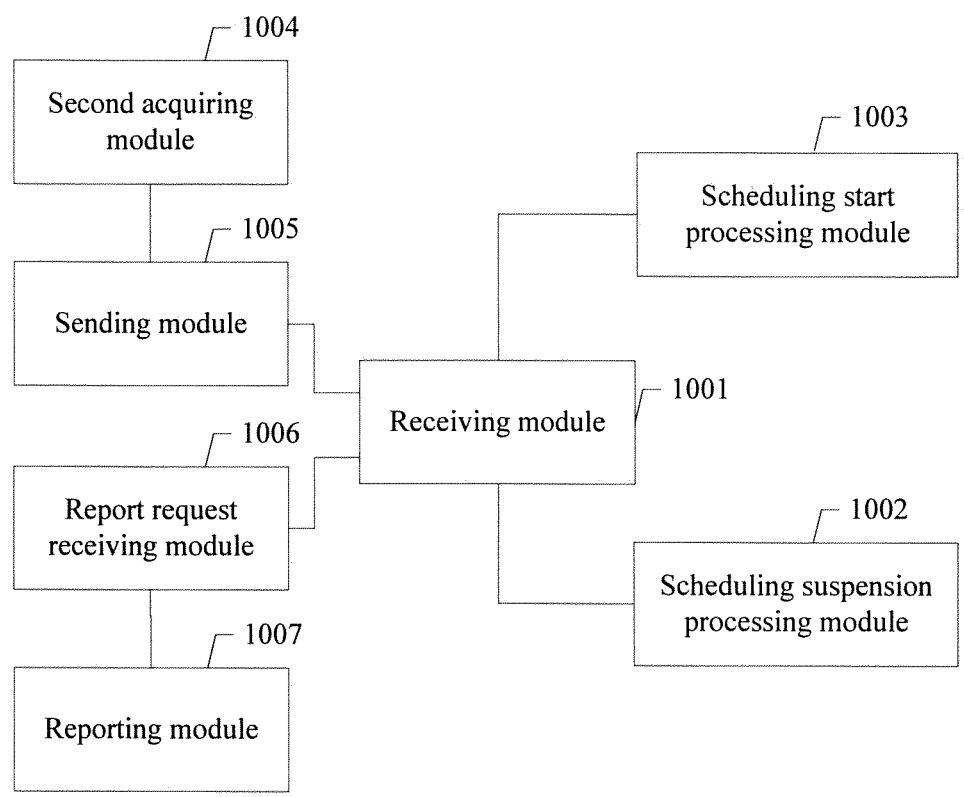
FIG. 10 is a schematic structural diagram of another apparatus for controlling data transmission on a radio communication network according to an embodiment of the present invention.
Figure 11:
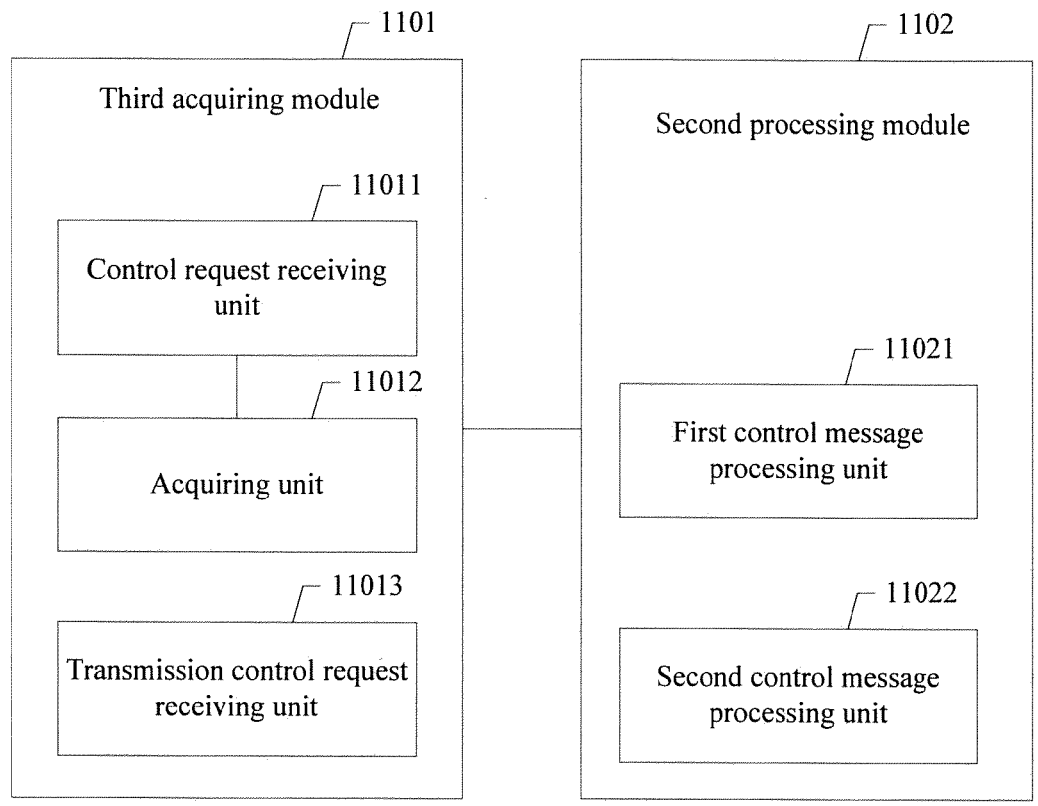
FIG. 11 is a schematic structural diagram of yet another apparatus for controlling data transmission on a radio communication network according to an embodiment of the present invention.

The following describes in detail an apparatus for controlling data transmission on a radio communication network according to the embodiments of the present invention with reference to FIG. 9 to FIG. 11.

It should be noted that, the apparatus for controlling data transmission on a radio communication network shown in FIG. 9 is configured to implement the method in the embodiments shown in FIG. 1 to FIG. 4 of the present invention. For ease of description, only the part related to the embodiment of the present invention is illustrated. For technical details that are not disclosed here, refer to the embodiments shown in FIG. 1 to FIG. 4 of the present invention.

Referring to FIG. 9, FIG. 9 is a schematic structural diagram of an apparatus for controlling data transmission on a radio communication network according to an embodiment of the present invention, and the apparatus may include:

a first acquiring module 901, configured to acquire transmission attribute information, where the transmission attribute information includes attribute information of to-be-transmitted data and scheduling attribute information of a base station.

The attribute information of the to-be-transmitted data includes one or more of the following: terminal identifier information, terminal priority information, data amount information of the to-be-transmitted data, priority information of the to-be-transmitted data, and delay requirement information of the to-be-transmitted data. The scheduling attribute information of the base station includes one or more of the following: network resource usage, scheduling time information, and scheduling resource amount. The terminal identifier information may be a unique identification code of a device, for example, IMEI. The data amount information of the to-be-transmitted data may be, for example, 10 MB and 1 GB. The delay requirement information of the to-be-transmitted data is delay tolerance of the to-be-transmitted data, for example, 4000 seconds, 100 seconds, or 30 seconds. The network resource usage is a percentage of currently occupied network resource. The scheduling time information is time required by the base station to schedule the to-be-transmitted data. The scheduling resource amount is the amount of scheduling resource provided by the base station for the to-be-transmitted data.

In a specific implementation, the first acquiring module 901 can acquire the attribute information of the to-be-transmitted data from a terminal, from a multi-level scheduler, or locally, and the base station can locally acquire the scheduling attribute information of the base station. Optionally, the first acquiring module 901 may include a first receiving unit, a second receiving unit, or a local acquiring unit; where:

the first receiving unit is configured to receive a transmission request message that includes the attribute information of the to-be-transmitted data and is sent by the terminal;

the second receiving unit is configured to receive a control message that includes the attribute information of the to-be-transmitted data and is sent by the multi-level scheduler; and the local acquiring unit is configured to locally read the attribute information of the to-be-transmitted data.

The first acquiring module 901 may acquire attribute information of one or more pieces of the to-be-transmitted data; specifically, the first acquiring module 901 may acquire attribute information of one or more pieces of the to-be-transmitted data of one terminal, or may acquire attribute information of to-be-transmitted data of a plurality of terminals.

A judging module 902 is configured to judge whether the scheduling attribute information of the base station acquired by the first acquiring module 901 meets a preset scheduling condition.

The judging module 902 may include a first judging unit and/or a second judging unit, where the first judging unit is configured to judge whether the scheduling attribute information of the base station acquired by the first acquiring module meets a preset first scheduling condition, and the second judging unit is configured to judge whether the scheduling attribute information of the base station acquired by the first acquiring module meets a preset second scheduling condition.

Optionally, the preset first scheduling condition includes but is not limited to: the network resource usage is greater than a preset first threshold value. The preset second scheduling condition includes but is not limited to: the network resource usage is less than a preset second threshold value.

A first processing module 903 is configured to: when a determining result of the judging module 902 is yes, send a scheduling suspension message and/or a scheduling start message to a terminal according to the transmission attribute information.

The first processing module 903 may include a first processing unit and/or a second processing unit; where the first processing unit is configured to: when a judging result of the first judging unit is yes, send the scheduling suspension message to the terminal according to the transmission attribute information, so that the terminal suspends sending of a resource request to the base station according to the scheduling suspension message; and the second processing unit is configured to: when a judging result of the second judging unit is yes, send the scheduling start message to the terminal according to the transmission attribute information, and start allocating a transmission resource for the to-be-transmitted data.

Optionally, the first processing unit is specifically configured to: when the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, determine the corresponding terminal identifier information and send the scheduling suspension message to a terminal corresponding to the terminal identifier information.

When the first judging unit judges that the acquired scheduling attribute information of the base station meets the preset first scheduling condition, the plurality of pieces of acquired transmission attribute information is compared; if the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, the corresponding terminal identifier information is determined and the scheduling suspension message is sent to a terminal corresponding to the terminal identifier information. Optionally, if attribute information of only one piece of the to-be-transmitted data is acquired, it is determined that the terminal priority information in the attribute information of the to-be-transmitted data is the lowest priority, or the data amount information of the to-be-transmitted data is the maximum data amount, or the priority information of the to-be-transmitted data is the lowest priority, or the delay requirement information of the to-be-transmitted data is the highest delay tolerance, and accordingly, it is determined that the scheduling time information in the scheduling attribute information of the base station is the longest time information, or the scheduling resource amount is the minimum resource amount.

Optionally, the scheduling suspension message may include a connection release message or a scheduling request suspension message.

Optionally, the scheduling suspension message may further include attribute information of a scheduling suspension object, where the attribute information of the scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

Optionally, the second processing unit is specifically configured to: when the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, determine the corresponding terminal identifier information and send the scheduling start message to a terminal corresponding to the terminal identifier information.

When the second judging unit judges that the acquired scheduling attribute information of the base station meets the preset second scheduling condition, the plurality of pieces of acquired transmission attribute information is compared; if the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, the corresponding terminal identifier information is determined and the scheduling start message is sent to a terminal corresponding to the terminal identifier information. Optionally, if attribute information of only one piece of the to-be-transmitted data is acquired, it is determined that the terminal priority information in the attribute information of the to-be-transmitted data is the highest priority, or the data amount information of the to-be-transmitted data is the minimum data amount, or the priority information of the to-be-transmitted data is the highest priority, or the delay requirement information of the to-be-transmitted data is the lowest delay tolerance, and accordingly, it is determined that the scheduling time information in the scheduling attribute information of the base station is the shortest time information, or the scheduling resource amount is the maximum resource amount.

Optionally, the scheduling start message may include: resource allocation indication information of the to-be-transmitted data sent by the first processing module 903 to the terminal or a resource allocation message of the to-be-transmitted data sent by the first processing module 903 to the terminal.

Optionally, the scheduling start message may further include attribute information of a scheduling start object, where the attribute information of the scheduling start object includes one or more of the following: terminal identifier information of the scheduling start object, data type of the scheduling start object, priority information of the scheduling start object, terminal priority information of the scheduling start object, and delay information of the scheduling start object.

Further optionally, the apparatus for controlling data transmission on a radio communication network according to the embodiment of the present invention may further include a report request sending module 904.

The report request sending module 904 is configured to send a data report request message to the terminal, so that the terminal reports the attribute information of the to-be-transmitted data to the base station according to the data report request message.

In a specific implementation, the report request sending module 904 sends the data report request message to the terminal, instructing the terminal to report the attribute information of the to-be-transmitted data. Therefore, the first acquiring module 901 acquires the attribute information of the to-be-transmitted data.

Further optionally, the apparatus for controlling data transmission on a radio communication network according to the embodiment of the present invention may further include a control request sending module 905.

The control request sending module 905 is configured to send a control request message to the multi-level scheduler, so that the multi-level scheduler sends the attribute information of the to-be-transmitted data to the base station according to the control request message.

In a specific implementation, when the first judging unit judges that the scheduling attribute information of the base station acquired by the first acquiring module 901 meets the preset first scheduling condition, the control request sending module 905 sends the control request message to the multi-level scheduler, requesting the multi-level scheduler to control the base station and return the attribute information of the to-be-transmitted data.

Further optionally, the apparatus for controlling data transmission on a radio communication network according to the embodiment of the present invention may further include a transmission control request sending module 906.

The transmission control request sending module 906 is configured to send a transmission control request message to the multi-level scheduler, so that the multi-level scheduler sends the attribute information of the to-be-transmitted data to the base station according to the transmission control request message.

In a specific implementation, when the second judging unit judges that the scheduling attribute information of the base station acquired by the first acquiring module 901 meets the preset second scheduling condition, the transmission control request sending module 906 sends the transmission control request message to the multi-level scheduler, requesting the multi-level scheduler to control the transmission of the base station and return the attribute information of the to-be-transmitted data.

The foregoing technical solution provides a method for controlling data transmission on a radio communication network. A first processing module can send a scheduling suspension message/a scheduling start message to a terminal according to transmission attribute information acquired by a first acquiring module; if the scheduling suspension message is sent to the terminal, the terminal can suspend sending of a resource request to a base station according to the scheduling suspension message; if the scheduling start message is sent to the terminal, transmission resource can start to be allocated for to-be-transmitted data. By using the embodiment of the present invention, data resource of the radio communication network can be scheduled according to the transmission attribute information, thereby avoiding a situation in which the base station is congested, reducing scheduling time, and improving the data transmission efficiency of the radio communication network.

Referring to FIG. 10, FIG. 10 is a schematic structural diagram of another apparatus for controlling data transmission on a radio communication network according to an embodiment of the present invention, and the apparatus may include:

a receiving module 1001, configured to receive a scheduling suspension message and/or a scheduling start message sent by a base station; and a scheduling suspension processing module 1002, configured to: when the receiving module 1001 receives the scheduling suspension message, suspend sending of a resource request to the base station according to the scheduling suspension message, where the scheduling suspension message includes attribute information of a scheduling suspension object.

The attribute information of the scheduling suspension object includes one or more of the following: terminal identifier information, data type of the scheduling suspension object, priority information of the scheduling suspension object, terminal priority information of the scheduling suspension object, and delay information of the scheduling suspension object.

Optionally, the scheduling suspension processing module 1002 is specifically configured to: when detecting that attribute information of to-be-transmitted data is the same as the attribute information of the scheduling suspension object, or the priority information of the to-be-transmitted data is lower than the data priority information of the scheduling suspension object, or the terminal priority information is lower than the terminal priority information of the scheduling suspension object, or the delay requirement information of the to-be-transmitted data is higher than the data delay information of the scheduling suspension object, suspend sending of the resource request for the to-be-transmitted data.

Optionally, when the terminal priority information is equal to or lower than the terminal priority information of the scheduling suspension object, it may be: the terminal suspends sending of resource requests for all to-be-transmitted data of the terminal; and it may also be: the terminal suspends sending of a resource request for at least one piece of to-be-transmitted data of the terminal.

A scheduling start processing module 1003 is configured to: when the receiving module 1001 receives the scheduling start message, start sending to-be-transmitted data to the base station according to the scheduling start message, where the scheduling start message includes attribute information of a scheduling start object.

The scheduling start message includes resource allocation indication information of the to-be-transmitted data sent by the base station or a resource allocation message of the to-be-transmitted data sent by the base station.

Optionally, the scheduling start processing module 1003 is specifically configured to: when detecting that the attribute information of the to-be-transmitted data is the same as the attribute information of the scheduling start object, or the priority information of the to-be-transmitted data is higher than the data priority information of the scheduling suspension object, or the terminal priority information is higher than the terminal priority information of the scheduling suspension object, or the delay requirement information of the to-be-transmitted data is lower than the data delay information of the scheduling suspension object, send the to-be-transmitted data to the base station.

Optionally, when the terminal priority information is equal to or higher than the terminal priority information of the scheduling start object, it may be: start sending all the to-be-transmitted data of the terminal; and it may also be: start sending at least one piece of the to-be-transmitted data of the terminal.

Further optionally, the apparatus for controlling data transmission on a radio communication network according to the embodiment of the present invention may further include a second acquiring module 1004 and a sending module 1005.

The second acquiring module 1004 is configured to acquire the attribute information of the to-be-transmitted data.

The terminal acquires attribute information of at least one piece of the to-be-transmitted data, where the attribute information of the to-be-transmitted data includes one or more of the following: terminal identifier information, terminal priority information, data amount information of the to-be-transmitted data, priority information of the to-be-transmitted data, and delay requirement information of the to-be-transmitted data.

The sending module 1005 is configured to send a transmission request message to the base station, where the transmission request message includes the attribute information of the to-be-transmitted data, and the attribute information is acquired by the second acquiring module.

The transmission request message may be an RRC connection request, and the transmission request message includes the attribute information of the to-be-transmitted data. After the terminal sends the RRC connection request to the base station, the base station sends an RRC connection establishment message to the terminal. Therefore, the terminal and the base station establish an RRC connection. The base station sends an RRC connection reconfiguration message to the terminal. The terminal configures a radio bearer according to the RRC connection reconfiguration message and sends an RRC connection reconfiguration completion message to the base station. Therefore, the terminal and the base station establish an RRC connection bearer.

Optionally, one or more terminals may send the transmission request message to the base station, or one terminal sends transmission request messages corresponding to different pieces of the to-be-transmitted data to the base station.

Further optionally, the apparatus for controlling data transmission on a radio communication network according to the embodiment of the present invention may further include a report request receiving module 1006 and a reporting module 1007.

The report request receiving module 1006 is configured to receive a data report request message sent by the base station.

The reporting module 1007 is configured to report the attribute information of the to-be-transmitted data to the base station according to the data report request message received by the report request receiving module.

The foregoing technical solution provides an apparatus for controlling data transmission on a radio communication network. A receiving module receives a scheduling suspension message and/or scheduling start message sent by a base station; if the scheduling suspension message is received, suspends sending of a resource request to the base station according to the scheduling suspension message; and if the scheduling start message is received, starts sending to-be-transmitted data to the base station. By using the embodiment of the present invention, data resource of the radio communication network can be scheduled according to the transmission attribute information, thereby avoiding a situation in which the base station is congested, reducing scheduling time, and improving the data transmission efficiency of the radio communication network.

Referring to FIG. 11, FIG. 11 is a schematic structural diagram of yet another apparatus for controlling data transmission on a radio communication network according to an embodiment of the present invention, and the apparatus may include:

a third acquiring module 1101, configured to acquire transmission attribute information, where the transmission attribute information includes attribute information of to-be-transmitted data and scheduling attribute information of a base station.

After receiving a control request message sent by the base station, a multi-level scheduler acquires the transmission attribute information from the control request message and stores the transmission attribute information. The control request message includes the transmission attribute information, and the transmission attribute information includes the attribute information of the to-be-transmitted data and the scheduling attribute information of the base station. The attribute information of the to-be-transmitted data includes one or more of the following: terminal identifier information, terminal priority information, data amount information of the to-be-transmitted data, priority information of the to-be-transmitted data, and delay requirement information of the to-be-transmitted data. The scheduling attribute information of the base station includes one or more of the following: network resource usage, scheduling time information, and scheduling resource amount.

Optionally, the third acquiring module 1101 may include a control request receiving unit 11011 and an acquiring unit 11012; where:

the control request receiving unit 11011 is configured to receive the control request message sent by the base station, where the control request message includes the transmission attribute information; and the acquiring unit 11012 is configured to acquire the transmission attribute information according to the control request message received by the control request receiving unit 11011.

Optionally, the third acquiring module 1101 may further include:

a transmission control request receiving unit 11013, configured to receive a transmission control request message sent by the base station, where the transmission control request message includes the transmission attribute information; and a second processing module 1102, configured to send a control message including the transmission attribute information acquired by the third acquiring module 1101 to the base station, so that the base station sends a scheduling suspension message and/or a scheduling start message to a terminal according to the control message.

Optionally, the second processing module 1102 may include a first control message processing unit, where a first control message processing unit 11021 is configured to send a first control message to the base station according to the transmission attribute information acquired by the acquiring unit 11012, so that the base station sends the scheduling suspension message to the terminal according to the first control message.

Optionally, attribute information of scheduling suspension object includes one or more of the following: terminal identifier information of the scheduling suspension object, data type of the scheduling suspension object, priority information of the scheduling suspension object, terminal priority information of the scheduling suspension object, and delay information of the scheduling suspension object.

Optionally, the first control message processing unit 11021 may include a first determining sub-unit, a first acquiring sub-unit, and a first sending sub-unit; where:

the first determining sub-unit is configured to: when the terminal priority information in the transmission attribute information is the lowest priority, or the data amount information of the to-be-transmitted data is the maximum data amount, or the priority information of the to-be-transmitted data is the lowest priority, or the delay requirement information of the to-be-transmitted data is the highest delay tolerance, or the scheduling time information is the longest time information, or the scheduling resource amount is the minimum resource amount, determine the corresponding terminal identifier information;

the first acquiring sub-unit is configured to acquire the attribute information of the corresponding scheduling suspension object according to the terminal identifier information determined by the first determining sub-unit; and the first sending sub-unit is configured to send a first control message to the base station, where the first control message includes the attribute information of the scheduling suspension object, and the attribute information is acquired by the first acquiring sub-unit.

Further optionally, the second processing module 1102 may further include a second control message processing unit 11022, where:

the second control message processing unit 11022 is configured to send a second control message to the base station according to the transmission control request message received by the transmission control request receiving unit, so that the base station sends the scheduling start message to the terminal according to the second control message.

Optionally, attribute information of scheduling start object includes one or more of the following: terminal identifier information of the scheduling start object, data type of the scheduling start object, priority information of the scheduling start object, terminal priority information of the scheduling start object, and delay information of the scheduling start object.

Optionally, the second control message processing unit 11022 may include a second determining sub-unit, a second acquiring sub-unit, and a second sending sub-unit; where:

the second determining sub-unit is configured to: when the terminal priority information in the transmission attribute information is the highest priority, or the data amount information of the to-be-transmitted data is the minimum data amount, or the priority information of the to-be-transmitted data is the highest priority, or the delay requirement information of the to-be-transmitted data is the lowest delay tolerance, or the scheduling time information is the shortest time information, or the scheduling resource amount is the maximum resource amount, determine the corresponding terminal identifier information;

the second acquiring sub-unit is configured to acquire the attribute information of the corresponding scheduling start object according to the terminal identifier information determined by the second determining sub-unit; and the second sending sub-unit is configured to send a second control message to the base station, where the second control message includes the attribute information of the scheduling start object, and the attribute information is acquired by the second acquiring sub-unit.

The foregoing technical solution provides an apparatus for controlling data transmission on a radio communication network. A multi-level scheduler can send a control message to a base station according to transmission attribute information, so that the base station sends a scheduling suspension message and/or scheduling start message to a terminal according to the control message, thereby implementing the scheduling according to the transmission attribute information, avoiding a situation in which the base station is congested, reducing scheduling time, and improving the data transmission efficiency of the radio communication network.

Figure 12:
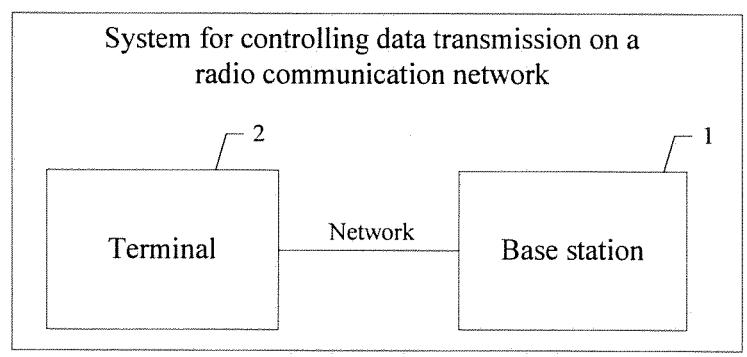
FIG. 12 is a schematic structural diagram of a system for controlling data transmission on a radio communication network according to an embodiment of the present invention.

Referring to FIG. 12, FIG. 12 is a system for controlling data transmission on a radio communication network according to an embodiment of the present invention, including a base station 1 and a terminal 2, where the base station 1 is the apparatus shown in FIG. 9, and the terminal 2 is the apparatus shown in FIG. 10; and the base station 1 and the terminal 2 may be connected over a radio network. For details about a structure and a function of the apparatus, see the related description in the embodiments shown in FIG. 9 and FIG. 10, which is not further described herein. It should be noted that, the system in this embodiment may be applied in the foregoing method.

Figure 13:
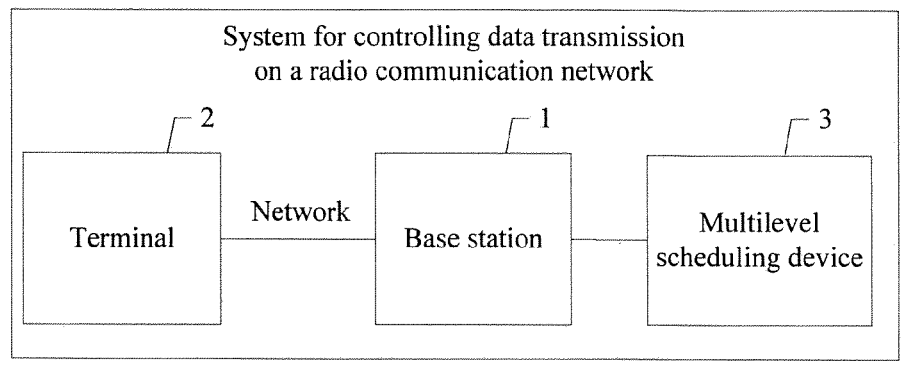
FIG. 13 is a schematic structural diagram of another system for controlling data transmission on a radio communication network according to an embodiment of the present invention.

Referring to FIG. 13, FIG. 13 is another system for controlling data transmission on a radio communication network according to an embodiment of the present invention, including a base station 1, a terminal 2, and a multi-level scheduler 3, where the base station 1 is the apparatus shown in FIG. 9, the terminal 2 is the apparatus shown in FIG. 10, and the multi-level scheduler 3 is the apparatus shown in FIG. 11; and the base station 1 and the terminal 2 may be connected over a radio network. For details about a structure and a function of the apparatus, see the related description in the embodiments shown in FIG. 9, FIG. 10, and FIG. 11, which is not further described herein. It should be noted that, the system in this embodiment may be applied in the foregoing method.

Figure 14:
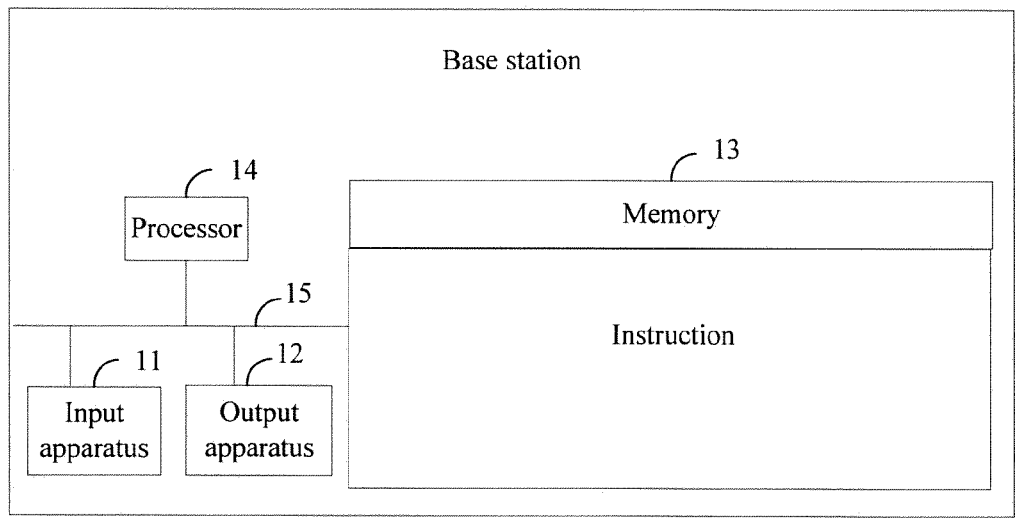
FIG. 14 is a schematic structural diagram of a base station according to an embodiment of the present invention.

Referring to FIG. 14, FIG. 14 is a schematic structural diagram of a base station according to an embodiment of the present invention. The base station provided in this embodiment corresponds to any one method shown in FIG. 1 to FIG. 4, and is an entity for performing the method for controlling data transmission on a radio communication network shown in FIG. 1 to FIG. 4. A specific implementation manner is shown in FIG. 14. The base station in the embodiment of the present invention includes an input apparatus 11, an output apparatus 12, a memory 13, and a processor 14, where the memory 13 stores a group of program code, and the processor 14 is configured to call the program code stored in the memory 13, so as to perform the following operations:

acquire transmission attribute information, where the transmission attribute information includes attribute information of to-be-transmitted data and scheduling attribute information of the base station; and judge whether the acquired scheduling attribute information of the base station meets a preset scheduling condition; and if yes, the base station sends a scheduling suspension message and/or a scheduling start message to a terminal according to the transmission attribute information.

Optionally, the acquiring, by the processor 14, transmission attribute information is specifically used to:

receive a transmission request message that includes the attribute information of the to-be-transmitted data and is sent by the terminal; or receive a control message that includes the attribute information of the to-be-transmitted data and is sent by a multi-level scheduler; or locally acquire the attribute information of the to-be-transmitted data.

Optionally, before the acquiring, by the processor 14, transmission attribute information, the system is further configured to:

send a data report request message to the terminal, so that the terminal reports the attribute information of the to-be-transmitted data to the base station according to the data report request message; or send a control request message to a multi-level scheduler, so that the multi-level scheduler sends the attribute information of the to-be-transmitted data to the base station according to the control request message.

Optionally, before the sending, by the processor 14, the scheduling start message to the terminal according to the transmission attribute information, the system is further configured to:

send a data report request message to the terminal, so that the terminal reports the attribute information of the to-be-transmitted data to the base station according to the data report request message; or send a transmission control request message to a multi-level scheduler, so that the multi-level scheduler sends the attribute information of the to-be-transmitted data to the base station according to the transmission control request message.

The processor 14 may be a central processing unit (central processing unit, CPU), an application-specific integrated circuit (application-specific integrated circuit, ASIC), or the like. The base station in this embodiment may further include a bus 15. The input apparatus 11, the output apparatus 12, the memory 13, and the processor 14 may be connected by and communicated over the bus 15.

The foregoing technical solution provides a base station that can send a scheduling suspension message/a scheduling start message to a terminal according to acquired transmission attribute information; if the scheduling suspension message is sent to the terminal, the terminal can suspend sending of a resource request to the base station according to the scheduling suspension message; if the scheduling start message is sent to the terminal, the transmission resource can start to be allocated for the to-be-transmitted data. By using the embodiment of the present invention, data resource of the radio communication network can be scheduled according to the transmission attribute information, thereby avoiding a situation in which the base station is congested, reducing scheduling time, and improving the data transmission efficiency of the radio communication network.

Figure 15:
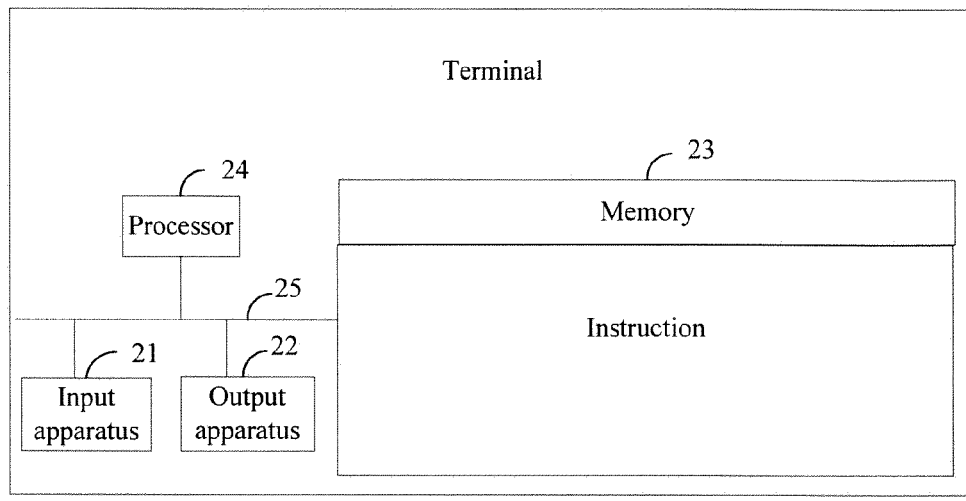
FIG. 15 is a schematic structural diagram of a terminal according to an embodiment of the present invention.

Referring to FIG. 15, FIG. 15 is a schematic structural diagram of a terminal according to an embodiment of the present invention. As shown in FIG. 15, the terminal in the embodiment of the present invention includes an input apparatus 21, an output apparatus 22, a memory 23, and a processor 24, where the memory 23 stores a group of program code, and the processor 24 is configured to call the program code stored in the memory 23, so as to perform the following operations:

receive a scheduling suspension message and/or a scheduling start message sent by a base station;

when receiving the scheduling suspension message, suspend sending of a resource request to the base station according to the scheduling suspension message, where the scheduling suspension message includes attribute information of a scheduling suspension object; and when receiving the scheduling start message, start sending to-be-transmitted data to the base station according to the scheduling start message, where the scheduling start message includes attribute information of a scheduling start object.

Optionally, before the receiving, by the processor 24, a scheduling suspension message and/or a scheduling start message sent by a base station, the terminal is further configured to:

acquire attribute information of the to-be-transmitted data; and send a transmission request message to the base station, where the transmission request message includes the attribute information of the to-be-transmitted data.

Optionally, before the receiving, by the processor 24, a scheduling suspension message and/or a scheduling start message sent by a base station, the terminal is further configured to:

receive a data report request message sent by the base station; and report the attribute information of the to-be-transmitted data to the base station according to the data report request message.

The terminal may be a mobile device, such as a mobile phone or a tablet computer. The processor 24 may be a central processing unit, an application-specific integrated circuit, or the like. The terminal in this embodiment may further include a bus 25. The input apparatus 21, the output apparatus 22, the memory 23, and the processor 24 may be connected by and communicated over the bus 25.

The foregoing technical solution provides a terminal that receives a scheduling suspension message and/or scheduling start message sent by a base station; if the scheduling suspension message is received, sending of a resource request to the base station according to the scheduling suspension message is suspended; if the scheduling start message is received, to-be-transmitted data starts to be sent to the base station. By using the embodiment of the present invention, data resource of the radio communication network can be scheduled according to transmission attribute information, thereby avoiding a situation in which the base station is congested, reducing scheduling time, and improving the data transmission efficiency of the radio communication network.

Figure 16:
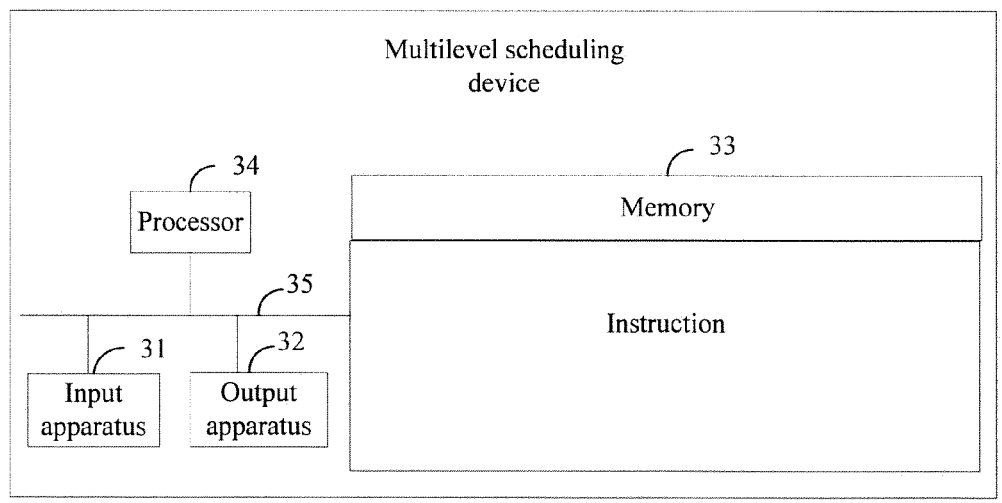
FIG. 16 is a schematic structural diagram of a multi-level scheduler according to an embodiment of the present invention.

Referring to FIG. 16, FIG. 16 is a schematic structural diagram of a multi-level scheduler according to an embodiment of the present invention. As shown in FIG. 16, the multi-level scheduler in the embodiment of the present invention includes an input apparatus 31, an output apparatus 32, a memory 33, and a processor 34, where the memory 33 stores a group of program code, and the processor 34 is configured to call the program code stored in the memory 33, so as to perform the following operations:

acquire transmission attribute information, where the transmission attribute information includes attribute information of to-be-transmitted data and scheduling attribute information of a base station;

send a control message including the transmission attribute information to the base station, so that the base station sends a scheduling suspension message and/or a scheduling start message to a terminal according to the control message.

Optionally, the acquiring, by the processor 34, transmission attribute information is specifically used to:

receive a control request message sent by the base station, where the control request message includes the transmission attribute information; and acquire the transmission attribute information according to the control request message.

Optionally, the sending, by the processor 34, a control message including the transmission attribute information to the base station is specifically used to:

send a first control message to the base station according to the acquired transmission attribute information, so that the base station sends the scheduling suspension message to the terminal according to the first control message.

Optionally, the sending, by the processor 34, a control message including the transmission attribute information to the base station is further specifically used to:

receive a transmission control request message sent by the base station, where the transmission control request message includes the transmission attribute information; and send a second control message to the base station according to the transmission control request message, so that the base station sends the scheduling start message to the terminal according to the second control message.

The processor 34 may be a central processing unit, an application-specific integrated circuit, or the like. The terminal in this embodiment may further include a bus 35. The input apparatus 31, the output apparatus 32, the memory 33, and the processor 34 may be connected by and communicated over the bus 35.

The foregoing technical solution provides a multi-level scheduler that can send a control message to a base station according to transmission attribute information, so that the base station sends a scheduling suspension message and/or scheduling start message to a terminal according to the control message, thereby implementing scheduling according to the transmission attribute information, avoiding a situation in which the base station is congested, reducing scheduling time, and improving the data transmission efficiency of the radio communication network.

Through the description of the foregoing embodiments, a person skilled in the art may clearly understand that the present invention may be implemented by hardware, by firmware, or by a combination thereof. When the present invention is implemented by software, the foregoing functions may be stored in a computer readable medium or serve as one or multiple instructions or codes on the computer readable medium for transmission. The computer readable medium includes a computer storage medium and a communication medium, where the communication medium includes any medium for conveniently transmitting computer programs from one place to another place. The storage medium may be any available medium that the computer can access. The following example is used but is not limited: the computer readable medium may include a RAM, a ROM, an EEPROM, a CD-ROM, or other optical disk storage, magnetic disk storage media, or other magnetic storage devices, or any other computer accessible medium that can be used to carry or store desired program codes that are in a form of an instruction or a data structure. In addition, any connection may become a computer readable medium properly. For example, if transmission from a website, a server, or other remote sources is implemented in the software by using a coaxial cable, an optical cable, a twisted pair cable, or a digital subscriber line (DSL), or a radio technology such as infrared, radio, and microwave, the coaxial cable, the optical cable, the twisted pair cable, or the DSL, or the radio technology such as infrared, radio, and microwave is included in the fixing of the medium. For example, the disk (Disk) and disc (disc) that are used in the present invention include a compact disc (CD), a laser disc, an optical disc, a digital versatile disc (DVD), a floppy disk, and a blue-ray disc, where the disk is usually used to replicate data magnetically, while the disc uses laser to replicate data optically. The foregoing combination should also be within the protection scope of the computer readable medium.

The foregoing descriptions are merely exemplary embodiments of the present invention, but are not intended to limit the protection scope of the present invention. Therefore, any equivalent variation made according to the claims of the present invention shall fall within the scope covered by the present invention.

What is claimed is:

1. A method for controlling data transmission on a radio communication network, the method comprising:

acquiring, by a base station, transmission attribute information comprising attribute information of to-be-transmitted data and scheduling attribute information of the base station;

judging whether the acquired scheduling attribute information of the base station meets one of a first preset scheduling condition and a second preset scheduling condition; and when the acquired scheduling attribute information of the base station meets the first preset scheduling condition, sending, by the base station, a scheduling suspension message to a terminal according to the transmission attribute information for suspending sending of a resource request to the base station according to the scheduling suspension message; and when the acquired scheduling attribute information of the base station meets the second preset scheduling condition, sending, by the base station, a scheduling start message to the terminal according to the transmission attribute information and allocating, by the base station, a transmission resource for the to-be-transmitted data.

2. The method according to claim 1, wherein the attribute information of the to-be-transmitted data comprises one or more of the following: terminal identifier information, terminal priority information, data amount information of the to-be-transmitted data, priority information of the to-be-transmitted data, and delay requirement information of the to-be-transmitted data.

3. The method according to claim 1, wherein acquiring, by a base station, transmission attribute information comprises:

receiving, by the base station, a transmission request message that comprises attribute information of the to-be-transmitted data and is sent by the terminal; or receiving, by the base station, a control message that comprises attribute information of the to-be-transmitted data and is sent by a multi-level scheduler; or locally reading, by the base station, attribute information of the to-be-transmitted data.

4. The method according to claim 1, wherein before acquiring, by a base station, transmission attribute information, the method comprises:

sending, by the base station, a data report request message to the terminal for reporting the attribute information of the to-be-transmitted data to the base station according to the data report request message; or sending, by the base station, a control request message to a multi-level scheduler for sending the attribute information of the to-be-transmitted data to the base station according to the control request message.

5. The method according to claim 1, wherein the scheduling attribute information of the base station comprises one or more of the following: network resource usage, scheduling time information, and scheduling resource amount.

6. A method for controlling data transmission on a radio communication network, the method comprising:

acquiring, by a terminal, attribute information of to-be-transmitted data of the terminal;

receiving, by the terminal, at least one of a scheduling suspension message and a scheduling start message sent by a base station;

wherein when the terminal receives the scheduling suspension message, suspending, by the terminal, sending of a resource request for to-be-transmitted data of the terminal to the base station according to the scheduling suspension message, wherein the scheduling suspension message comprises attribute information of a scheduling suspension object; and wherein when the terminal receives the scheduling start message, starting, by the terminal, sending the to-be-transmitted data of the terminal to the base station according to the scheduling start message, wherein the scheduling start message comprises attribute information of a scheduling start object.

7. The method according to claim 6, wherein after acquiring, by the terminal, attribute information of the to-be-transmitted data of the terminal, the method comprises:

sending, by the terminal, a transmission request message to the base station, wherein the transmission request message comprises the attribute information of the to-be-transmitted data of the terminal.

8. The method according to claim 6, wherein the attribute information of the to-be-transmitted data of the terminal comprises one or more of the following: terminal identifier information, terminal priority information, data amount information of the to-be-transmitted data of the terminal, priority information of the to-be-transmitted data of the terminal, and delay requirement information of the to-be-transmitted data.

9. The method according to claim 6, wherein before receiving, by a terminal, a scheduling suspension message and/or a scheduling start message sent by a base station, the method comprises:

receiving, by the terminal, a data report request message sent by the base station; and reporting, by the terminal, the attribute information of the to-be-transmitted data of the terminal to the base station according to the data report request message.

10. A base station, comprising:
a processor, configured to:
acquire transmission attribute information comprising attribute information of to-be-transmitted data and scheduling attribute information of a base station,
judge whether the acquired scheduling attribute information of the base station meets one of a first preset scheduling condition and a second preset scheduling condition; and
the base station is configured to send, when the acquired scheduling attribute information of the base station meets the first preset scheduling condition, a scheduling suspension message to a terminal according to the transmission attribute information for suspending sending of a resource request to the base station according to the scheduling suspension message; and
the base station is configured to send, when the acquired scheduling attribute information of the base station meets the second preset scheduling condition, a scheduling start message to the terminal according to the transmission attribute information and to allocate a transmission resource for the to-be-transmitted data.

11. The base station according to claim 10, wherein the attribute information of the to-be-transmitted data comprises one or more of the following: terminal identifier information, terminal priority information, data amount information of the to-be-transmitted data, priority information of the to-be-transmitted data, and delay requirement information of the to-be-transmitted data.

12. The apparatus according to claim 11, wherein the scheduling attribute information of the base station comprises one or more of the following: network resource usage, scheduling time information, and scheduling resource amount.

13. The apparatus according to claim 10, wherein:
the processor is further configured to locally read the attribute information of the to-be-transmitted data; or
the base station further comprises a first receiver configured to receive a transmission request message that comprises the attribute information of the to-be-transmitted data and is sent by the terminal; or
the base station further comprises a second receiver, the second receiver is configured to receive a control message that comprises the attribute information of the to-be-transmitted data and is sent by a multi-level scheduler.

14. The base station according to claim 10, wherein the base station further comprises:
a transmitter configured to:
send a data report request message to the terminal for reporting the attribute information of the to-be-transmitted data to the base station according to the data report request message; or
send a control request message to the multi-level scheduler for sending the attribute information of the to-be-transmitted data to the base station according to the control request message.

15. A terminal, comprising:
a processor, configured to acquire attribute information of the to-be-transmitted data;
a receiver, configured to receive at least one of a scheduling suspension message and a scheduling start message sent by a base station;
wherein the processor is further configured to suspend sending of a resource request to the base station according to the scheduling suspension message when the receiver receives the scheduling suspension message, wherein the scheduling suspension message comprises attribute information of a scheduling suspension object; and
a transmitter, configured to start sending to-be-transmitted data to the base station according to the scheduling start message when the receiver receives the scheduling start message, wherein the scheduling start message comprises attribute information of a scheduling start object.

16. The terminal according to claim 15, wherein the transmitter is further configured to send a transmission request message to the base station, wherein the transmission request message comprises the attribute information of the to-be-transmitted data.

17. The terminal according to claim 15, wherein the attribute information of the to-be-transmitted data comprises one or more of the following: terminal identifier information, terminal priority information, data amount information of the to-be-transmitted data, priority information of the to-be-transmitted data, and delay requirement information of the to-be-transmitted data.

18. The terminal according to claim 15, wherein:
the receiver is further configured to receive a data report request message sent by the base station; and
the transmitter is further configured to report the attribute information of the to-be-transmitted data to the base station according to the data report request message received by the report request receiving module.

* * * * *